(12) United States Patent
Liu et al.

(10) Patent No.: US 12,047,974 B2
(45) Date of Patent: *Jul. 23, 2024

(54) TECHNIQUES FOR INDICATING DOWNLINK CONTROL INFORMATION IN MULTICAST/BROADCAST WIRELESS COMMUNICATIONS

(71) Applicant: QUALCOMM Incorporated, San Diego, CA (US)

(72) Inventors: Le Liu, San Jose, CA (US); Alberto Rico Alvarino, San Diego, CA (US); Peter Gaal, San Diego, CA (US); Xiaoxia Zhang, San Diego, CA (US); Tao Luo, San Diego, CA (US); Prasad Reddy Kadiri, San Diego, CA (US); Ayan Sengupta, San Diego, CA (US); Kazuki Takeda, Minato-ku (JP); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,949

(22) Filed: Apr. 24, 2023

(65) Prior Publication Data
US 2023/0328749 A1    Oct. 12, 2023

Related U.S. Application Data

(63) Continuation of application No. 17/157,778, filed on Jan. 25, 2021, now Pat. No. 11,671,979.
(Continued)

(51) Int. Cl.
*H04W 72/23* (2023.01)
*H04L 1/1812* (2023.01)
(Continued)

(52) U.S. Cl.
CPC ......... *H04W 72/23* (2023.01); *H04L 1/1812* (2013.01); *H04W 4/06* (2013.01); *H04W 72/044* (2013.01)

(58) Field of Classification Search
CPC ............ H04W 72/0446; H04W 88/08; H04W 72/0453; H04W 24/00; H04W 72/23;
(Continued)

(56) References Cited

U.S. PATENT DOCUMENTS 8,369,280 B2    2/2013   Dinan
8,811,326 B2    8/2014   Yang et al.
(Continued)

FOREIGN PATENT DOCUMENTS

CN    103380649 A    10/2013
CN    109644325 A    4/2019

OTHER PUBLICATIONS

3GPP TSG-RAN WG1 Meeting #58bis, Miyazaki, Japan, Oct. 12-16, 2009, R1-093888, Oct. 12-16, 2009, Agenda item:4, Source: Inter Digital Communications, LLC, Title: Unicast Reuse of MBSFN-reserved subframes (Year: 2009).*

(Continued)

*Primary Examiner* — Peter G Solinsky
*Assistant Examiner* — Sanjay K Dewan
(74) *Attorney, Agent, or Firm* — QUALCOMM Incorporated

(57) ABSTRACT

Aspects described herein relate to indicating downlink control information (DCI) for multicast and/or broadcast (MB) communications using DCI formats that may be based on existing DCI formats and/or size for unicast communications, paging signals, system information signals, etc., or may include shortened formats without fields for information that may not be used in MB communications.

17 Claims, 8 Drawing Sheets

Related U.S. Application Data

(60) Provisional application No. 62/972,516, filed on Feb. 10, 2020.

(51) Int. Cl.
*H04W 4/06* (2009.01)
*H04W 72/044* (2023.01)

(58) Field of Classification Search
CPC .... H04W 4/06; H04W 72/044; H04L 5/0007; H04L 1/1812
USPC ......................................................... 370/330
See application file for complete search history.

(56) References Cited

U.S. PATENT DOCUMENTS

| | | | |
|---|---|---|---|
| 8,897,253 | B2 | 11/2014 | Shin et al. |
| 10,419,892 | B2 | 9/2019 | Mazzarese et al. |
| 11,671,979 | B2* | 6/2023 | Liu ....................... H04W 72/23 370/330 |
| 11,737,119 | B2* | 8/2023 | Lee ................... H04L 27/26025 370/330 |
| 11,757,593 | B2* | 9/2023 | Kim ......................... H04L 1/08 370/330 |
| 2015/0319777 | A1 | 11/2015 | Seo et al. |
| 2016/0020886 | A1 | 1/2016 | Kim et al. |
| 2016/0066305 | A1 | 3/2016 | Chae et al. |
| 2018/0019794 | A1 | 1/2018 | Kowalski et al. |
| 2019/0182802 | A1* | 6/2019 | Yu ......................... H04W 68/02 |
| 2019/0223160 | A1* | 7/2019 | He ....................... H04W 68/005 |
| 2020/0022144 | A1 | 1/2020 | Papasakellariou |
| 2021/0250918 | A1 | 8/2021 | Liu et al. |
| 2023/0077471 | A1* | 3/2023 | Kim ....................... H04L 5/001 370/330 |

OTHER PUBLICATIONS

3GPP TSG-RAN WG1 Meeting #98bis, Chongqing, China, Oct. 14-20, 2019, R1-1910900, Title: Determination of the number of reserved bits in DCI format 1_0, Source of WG: Ericsson, Work Item code: NR_newRAT-Core, Date: Oct. 4, 2019. (Year: 2019).*
Chen H., et al., "On the Performance of PDCCH in LTE and 5G New Radio", IEEE, 2018 IEEE Globecom Workshops (GC Wkshps), Institute for Communications Systems, University of Surrey, UK, Institute of Telecom and Multimedia Applications, Spain, Samsung Electronics R&D UK, 2018, IEEE, 2018, 6 Pages.
Ericsson: "Determination of the Number of Reserved Bits in DCI Format 1_0", 3GPP Draft, 3GPP TSG-RAN WG1 Meeting #98bis, R1-1910900, Draft Change Request, 38.212 CR rev, Current Version 15.7.0, Determination of the Number of Reserved Bits in DCI Format 10, 3rd Generation Partnership Project (3GPP), Mobile Competence Centre, 650, Route Des Lucioles, F-06921 Sophia-Ant, vol. RAN WG1, No. Chongqing, China, Oct. 14, 2019Oct. 20, 2019, Oct. 5, 2019, XP051789677, 4 Pages, p. 2-p. 3.
Interdigital Communications LLC: "Unicast Reuse of MBSFN-Reserved Subframes", 3GPP Draft, R1-093888, 3GPP TSG-RAN WG1 Meeting #58bis, Agenda item: 4, Miyazaki, Japan, Oct. 12-16, 2009, 5 Pages, Retrieved from the Internet: URL: http://www.3gpp.org/ftp/tsg_ran/WG1_RL1/TSGR1_58b/Docs/R1-093888.zip.
International Preliminary Report on Patentability—PCT/US2021/015112—The International Bureau of WIPO—Geneva, Switzerland—dated Aug. 25, 2022.
International Search Report and Written Opinion—PCT/US2021/015112—ISA/EPO—daed May 10, 2021.

* cited by examiner

TECHNIQUES FOR INDICATING DOWNLINK CONTROL INFORMATION IN MULTICAST/BROADCAST WIRELESS COMMUNICATIONS

CLAIM OF PRIORITY UNDER 35 U.S.C. § 119

The present Application for Patent is a continuation of application Ser. No. 17/157,778, entitled "TECHNIQUES FOR INDICATING DOWNLINK CONTROL INFORMATION IN MULTICAST/BROADCAST WIRELESS COMMUNICATIONS" filed Jan. 25, 2021, which claims priority to Provisional Patent Application No. 62/972,516, entitled "TECHNIQUES FOR INDICATING DOWNLINK CONTROL INFORMATION IN MULTICAST WIRELESS COMMUNICATIONS" filed Feb. 10, 2020, which are assigned to the assignee hereof and hereby expressly incorporated by reference herein for all purposes.

BACKGROUND

Aspects of the present disclosure relate generally to wireless communication systems, and more particularly, to multicast and/or broadcast (e.g. multicast/broadcast) communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In wireless communication technologies such as 5G NR, downlink control information (DCI) formats are defined for transmitting DCI to user equipment (UEs), where the DCI can indicate resources for the UEs to use in unicast communications with a base station. A base station can transmit an indication of a DCI format to a UE for receiving DCI from the base station, and can then transmit the DCI according to the DCI format. The DCI can indicate resources for uplink or downlink communications, and DCI for uplink communications can have different DCI formats than DCI for downlink communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes receiving downlink control information (DCI) of a DCI format, determining, based at least in part on a radio network temporary identifier (RNTI) used to scramble the DCI, that the DCI corresponds to multicast and/or broadcast (MB) communications, determining the DCI format of the DCI corresponding to the MB communications, wherein the DCI format is modified for the MB communications, determining, from the DCI, one or more parameters associated with one or more fields of the modified DCI format for receiving the MB communications, and receiving, based on the one or more parameters, the MB communications.

In another example, an apparatus for wireless communication is provided that includes a transceiver, a memory configured to store instructions, and one or more processors communicatively coupled with the transceiver and the memory. The one or more processors are configured to receive DCI of a DCI format, determine, based at least in part on a RNTI used to scramble the DCI, that the DCI corresponds to MB communications, determine the DCI format of the DCI corresponding to the MB communications, wherein the DCI format is modified for the MB communications, determine, from the DCI, one or more parameters associated with one or more fields of the modified DCI format for receiving the MB communications, and receive, based on the one or more parameters, the MB communications.

In another example, an apparatus for wireless communication is provided that includes means for receiving DCI of a DCI format, means for determining, based at least in part on a RNTI used to scramble the DCI, that the DCI corresponds to MB communications, means for determining the DCI format of the DCI corresponding to the MB communications, wherein the DCI format is modified for the MB communications, means for determining, from the DCI, one or more parameters associated with one or more fields of the modified DCI format for receiving the MB communications, and means for receiving, based on the one or more parameters, the MB communications.

In another example, a computer-readable medium including code executable by one or more processors for wireless communications is provided. The code includes code for receiving DCI of a DCI format, determining, based at least in part on a RNTI used to scramble the DCI, that the DCI corresponds to MB communications, determining the DCI format of the DCI corresponding to the MB communications, wherein the DCI format is modified for the MB communications, determining, from the DCI, one or more parameters associated with one or more fields of the modified DCI format for receiving the MB communications, and receiving, based on the one or more parameters, the MB communications.

In another example, a method for wireless communications is provided. The method includes generating DCI for MB communications using a DCI format, wherein the DCI format is modified for MB communications, scrambling the DCI with a RNTI that corresponds to MB communications, transmitting the DCI, and transmitting, based on one or more parameters in the DCI, the MB communications.

In a further example, an apparatus for wireless communication is provided including a transceiver, a memory configured to store instructions, and one or more processors communicatively coupled with the memory and the transceiver. The one or more processors are configured to generate DCI for MB communications using a DCI format, wherein the DCI format is modified for MB communications, scramble the DCI with a RNTI that corresponds to MB communications, transmit the DCI, and transmit, based on one or more parameters in the DCI, the MB communications.

In an aspect, an apparatus for wireless communication is provided that includes a transceiver, a memory configured to store instructions, and one or more processors communicatively coupled with the memory and the transceiver. The one or more processors are configured to receive DCI from a network node, wherein the DCI indicates a DCI format defined for unicast physical downlink shared channel (PDSCH) communications, decode, based at least in part on a paging radio network temporary identifier (P-RNTI) used to scramble the DCI, the PDSCH scheduled by the DCI for MB communications including one or more parameters for receiving the MB communications, and receive, based on the one or more parameters, the MB communications.

In another example, a method for wireless communication is provided that includes receiving DCI from a network node, wherein the DCI indicates a DCI format defined for unicast PDSCH communications, decoding, based at least in part on a P-RNTI used to scramble the DCI, the PDSCH scheduled by the DCI for MB communications including one or more parameters for receiving the MB communications, and receiving, based on the one or more parameters, the MB communications.

In another example, an apparatus for wireless communication is provided that includes a transceiver, a memory configured to store instructions, and one or more processors communicatively coupled with the memory and the transceiver. The one or more processors are configured to encode, based at least in part on a P-RNTI used to scramble a DCI, a PDSCH scheduled by the DCI for MB communications including one or more parameters for receiving the MB communications, transmit the DCI, wherein the DCI indicates a DCI format defined for unicast PDSCH communications, and transmit, based on the one or more parameters, the MB communications.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
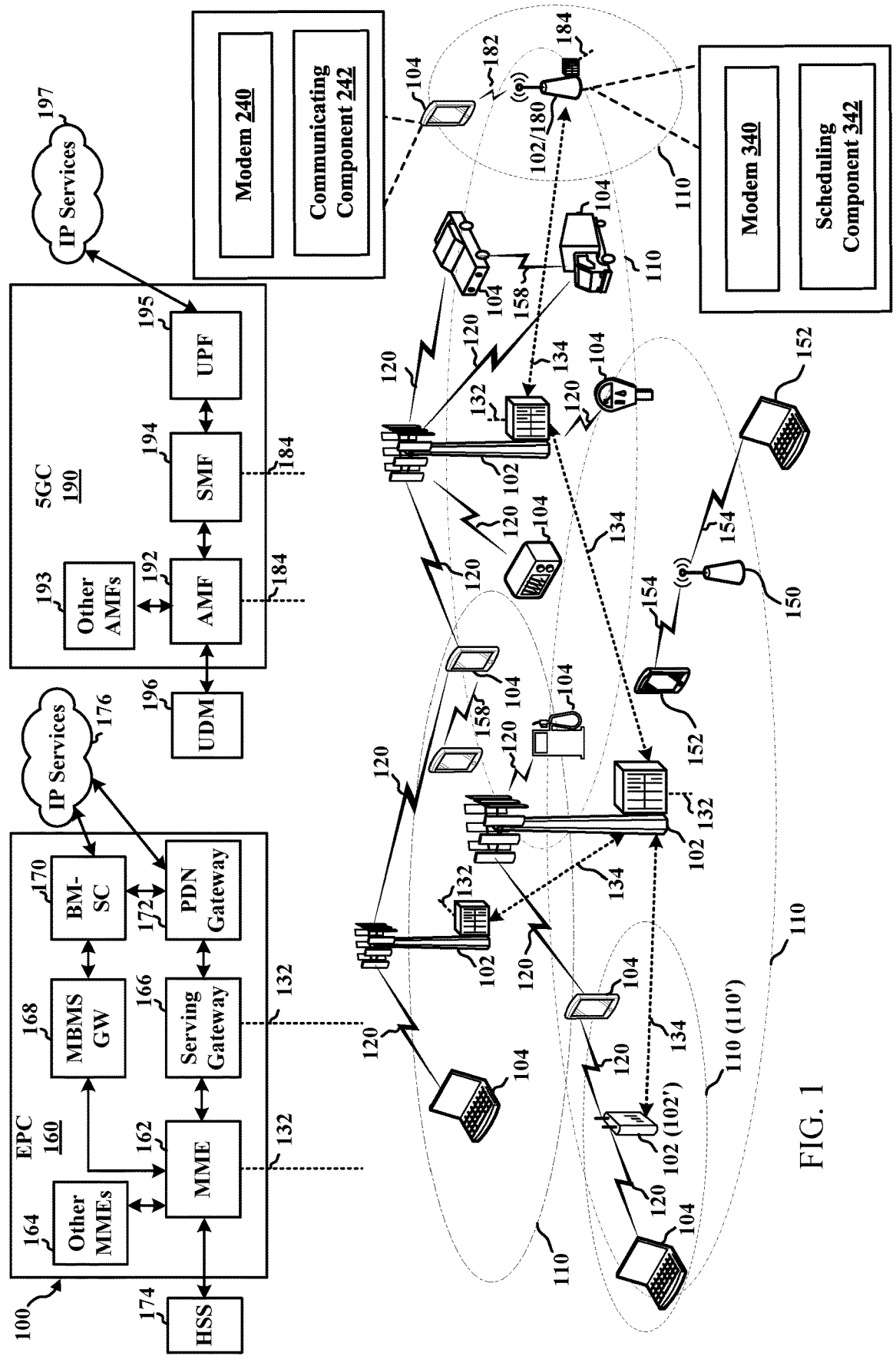
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to providing downlink control information (DCI) formats for indicating DCI for multicast and/or broadcast (MB) communications. For example, MB communications can correspond to communications intended to be received by multiple devices. In an example, a base station can transmit MB communications over resources (e.g., frequency and/or time resources) for multiple user equipment (UEs) to concurrently detect and/or receive the MB communications. In an example, an existing DCI format can be used to indicate the DCI for MB communications, where the existing DCI format may correspond to a DCI format defined, by a wireless communication technology, e.g. for unicast communications, paging signals, system information broadcast signals, etc. In this example, though an existing DCI format can be used, the DCI format for MB communications may include one or more different fields or parameters, where bits of a field or parameter of the existing DCI format can be modified such that the one or more different fields or parameters are used for MB communications. In addition, for example, a DCI defined using the existing format can be scrambled with an identifier related to, or otherwise indicative of, MB communications to facilitate identification of the DCI and determination of the DCI format as corresponding to MB communications. In another example, the DCI format may be based on the existing DCI format, but may be defined to not include certain unnecessary fields (e.g., feedback related fields, such as hybrid automatic repeat/request (HARQ) feedback related fields).

In a specific example, the existing DCI format can be defined in fifth generation (5G) new radio (NR) wireless communication technology. For example, the DCI format contents can include a set of information that schedules downlink data channel (e.g., physical downlink shared channel (PDSCH)) or uplink data channel (e.g., physical uplink shared channel (PUSCH)). In 5G NR, DCI Formats 0_0 and 0_1 are defined for the scheduling of PUSCH in one cell, and DCI Formats 1_0 and 1_1 are defined for the scheduling of PDSCH in one cell (e.g., as specified in third generation partnership project (3GPP) technical specification (TS) 38.212, Table 7.3.1-1). In general, for example, DCI formats in 5G for data scheduling can include fallback DCI formats (e.g., DCI formats 1_0, 0_0) that support a limited set of features. The fallback DCI formats can have less overhead than other, e.g. non-fallback DCI formats, and can be used during transition period of feature configuration (e.g., in radio resource control (RRC) reconfiguration), in which case the network may not know the exact time when the UE has applied the configuration. In addition, for example, DCI formats in 5G can include non-fallback DCI formats (e.g., DCI formats 11, 01) that support additional (e.g., all) features (e.g., such as cross-carrier scheduling, bandwidth part (BWP) switching) configured to the UE, which may not be supported by the fallback DCI. The non-fallback DCI formats can be flexible and the size of the non-fallback DCI format can vary depending on the active configuration, for example.

In an example, DCI formats 1_0 and/or 1_1 can be reused or used as baseline for MB communications. In one example, DCI format 1_0 for MB communications can be based on NR existing DCI format 1_0 for SI, paging or unicast. In an example, DCI format 1_0 can be used with cyclic redundancy check (CRC) scrambled by multicast broadcast (MB)-radio network temporary identifier (RNTI) or a group (G)-RNTI based on modified DCI format 1_0 for cell (C)-RNTI. In this example, MB-RNTI can be the RNTI for multicast control, e.g. over a multicast control channel (MCCH), which may be configured by RRC and/or G-RNTI can be the RNTI for multicast data, e.g. over a multicast traffic channel (MTCH), which may be configured by RRC or MCCH. In addition, in this example, time and/or frequency resource allocation (RA) can include using the configuration for multicast only or for both multicast and unicast. In another example, DCI format 1_0 can be used with CRC scrambled by a paging (P)-RNTI with additional fields for MB. In this example, (e.g., if MB-RNTI/G-RNTI is not configured), paging using P-RNTI can be used to carry MB control and/or data. Additionally, in this example, time and/or frequency RA can include using the configuration for both multicast and paging. In yet another example, DCI format 1_0 can be used with CRC scrambled by system information (SI)-RNTI with additional fields for MB. In this example, (e.g., if MB-RNTI/G-RNTI is not configured), system information block (SIB) using SI-RNTI can be used to carry MB control and/or data. In this example, time and/or frequency RA can include using the configuration for both MB communications and SIB transmissions. In yet another example, DCI format 1_1 for MB can be based on NR existing DCI format 1_1 for unicast. In this example, DCI format 1_1 can be used with CRC scrambled by MB-RNTI/ G-RNTI based on modified DCI format 1_1 for C-RNTI. Additionally, in this example, time and/or frequency RA can include using the configuration for multicast only or for both multicast and unicast.

In the examples described herein, DCI format(s) can be defined and used for communicating DCI for MB communications. A UE receiving the DCI can determine one or more parameters related to the DCI in order to receive and process the DCI for determining information for receiving MB communications. In addition, for example, using an existing DCI format for MB communications can reduce complexity of determining possible formats at the base station and/or UE. In another example, using an existing DCI format and/or corresponding size for multicast communications can allow for adding the MB information to the DCI format without impacting a processing of DCI at legacy UEs that may not support the DCI formats for MB. For example, using a RNTI specific to MB communications may prevent the legacy UEs from processing the DCI, and using a size of an existing DCI format may allow the legacy UEs to skip the DCI for MB communications to potentially locate other DCI in a search space.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for receiving and detecting DCI related to MB communications, and some nodes may have a modem 340 and scheduling component 342 for generating and transmitting DCI for MB communications, as described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172.

The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, scheduling component 342 can generate and transmit a DCI related to MB communications. The DCI can be of an existing DCI format and/or size. Alternatively, the DCI can be of a modified DCI format, which may or may not have a same size as an existing DCI format. The DCI format may be modified for MB communications, e.g. by modifying one or more of the fields or related bits to indicate MB parameters. In another example, the DCI may be indicated as related to MB by using a MB-specific RNTI to scramble the DCI, by an indicator in the DCI, etc. In an example, communicating component 242 can receive the DCI and can determine that the DCI is for MB communications. For example, this determination may be based on one or more of the RNTI used to scramble the DCI, an indicator in the DCI, etc. Communicating component 242 can also accordingly determine a DCI format of the DCI for processing the DCI to obtain parameters or other information related to receiving the MB communications. Scheduling component 342 can transmit the MB communications, and communicating component 242 can receive the MB communications, based on the DCI.

Turning now to FIGS. 2-8, aspects are depicted with reference to one or more components and one or more methods that may perform the actions or operations described herein, where aspects in dashed line may be optional. Although the operations described below in FIGS. 4-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 2:
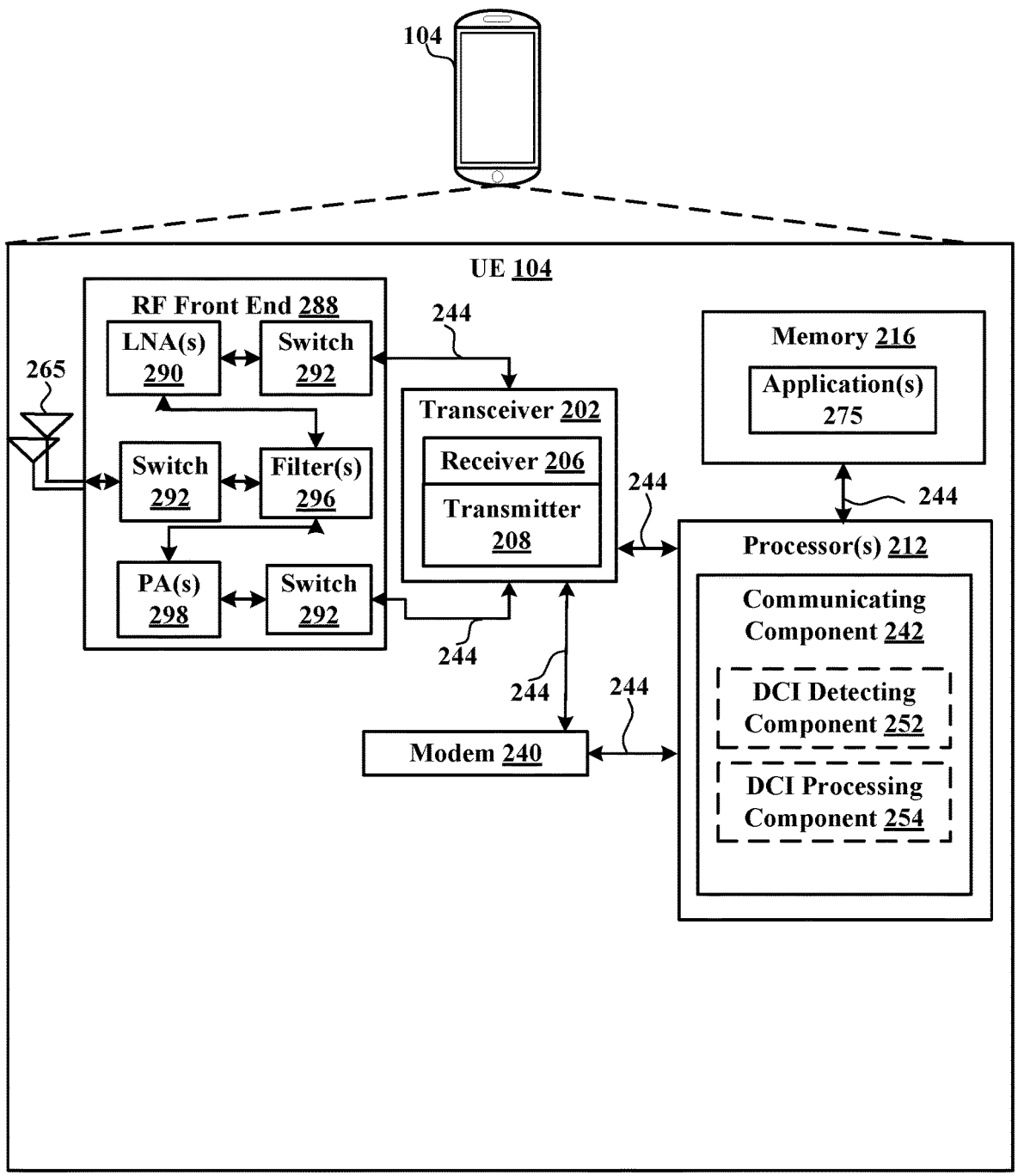
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for communicating with a base station 102 to receive MB communications and/or receive DCI related to receiving MB communications, as described further herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a DCI detecting component 252 for detecting DCI received from a base station, and/or a DCI processing component 254 for processing the DCI to determine one or more parameters for receiving MB communications from the base station (and/or another base station), as described further herein.

In an aspect, the processor(s) 212 may correspond to one or more of the processors described in connection with the UE in FIG. 8. Similarly, the memory 216 may correspond to the memory described in connection with the UE in FIG. 8.

Figure 3:
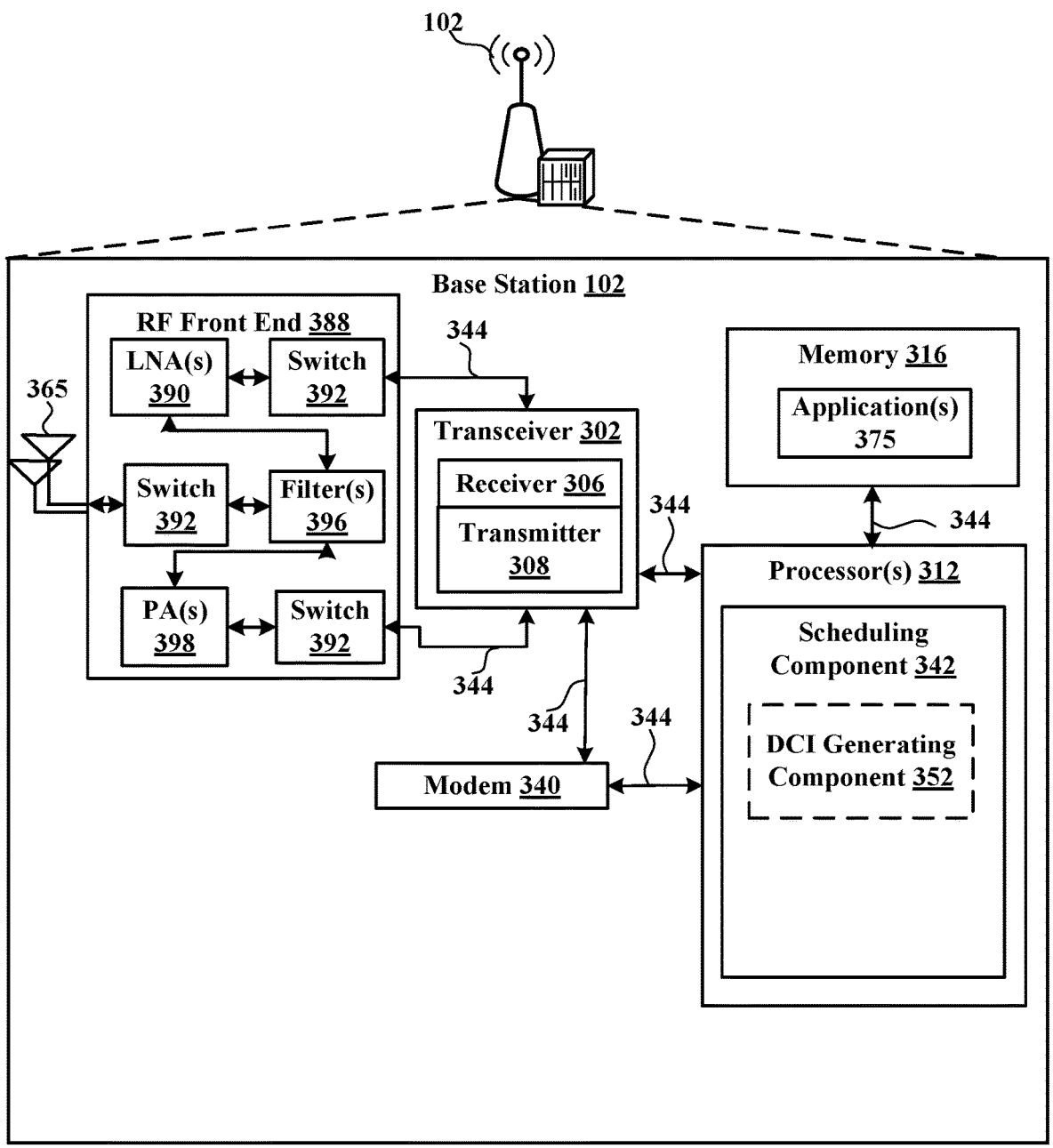
FIG. 3 is a block diagram illustrating an example of a base station, in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for transmitting MB communications and/or transmitting DCI for receiving MB communications, as described further herein. The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a DCI generating component 352 for generating DCI related to MB communications, and/or transmitting the DCI based on a DCI format for MB communications, as described further herein.

In an aspect, the processor(s) 312 may correspond to one or more of the processors described in connection with the base station in FIG. 8. Similarly, the memory 316 may correspond to the memory described in connection with the base station in FIG. 8.

Figure 4:
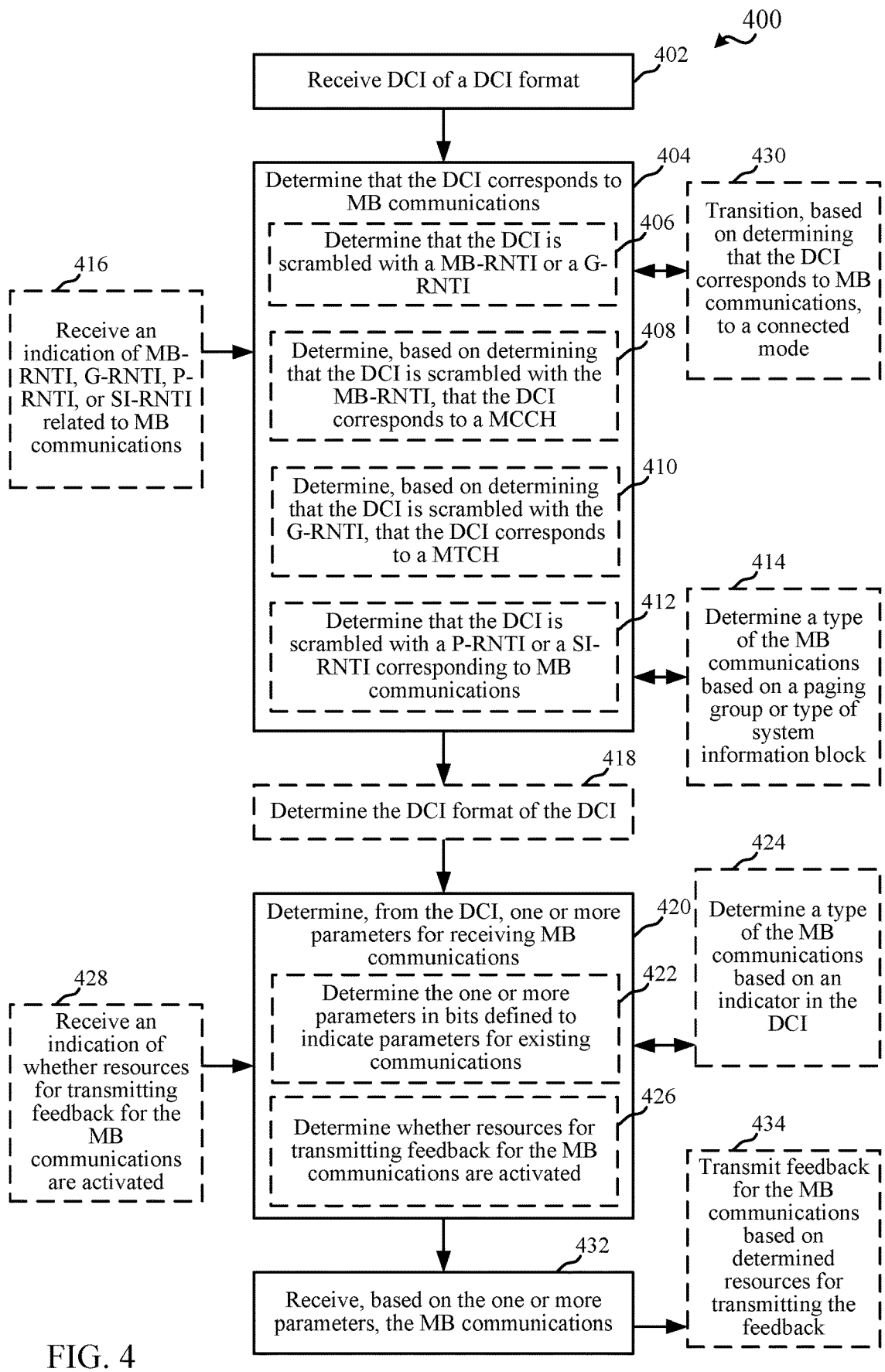
FIG. 4 is a flow chart illustrating an example of a method for detecting downlink control information (DCI) for multicast and/or broadcast (MB) communications using an existing DCI format, in accordance with various aspects of the present disclosure.

FIG. 4 illustrates a flow chart of an example of a method 400 for receiving DCI for MB communications. In an example, a UE 104 can perform the functions described in method 400 using one or more of the components described in FIGS. 1-2.

In method 400, at Block 402, the UE can receive DCI of a DCI format. In an aspect, DCI detecting component 252, e.g., in conjunction with processor(s) 212, memory 216, transceiver 202, communicating component 242, etc., can receive the DCI of the DCI format. For example, DCI detecting component 252 can receive the DCI for MB communications having an existing DCI format (e.g., a DCI format defined by a wireless communication technology, such as 5G NR, for unicast, paging, system information, etc. type of communications). In an example, DCI detecting component 252 can detect the DCI in a search space defined for a control channel (e.g., a common search space (CSS), UE-specific search space (USS), etc., defined for a physical downlink control channel (PDCCH)). Moreover, for example, the DCI may use a format defined in a wireless communication technology (e.g., 5G NR) for other types of communications that may not include MB communications, such as DCI formats for unicast communications, DCI formats for paging signals, DCI formats for SI broadcast signals, and/or the like. In this regard, for example, DCI detecting component 252 can detect the DCI having the existing format in a search space defined by the wireless communication technology for the existing DCI formats. In addition, in an example, the DCI for MB communications can have the same format as the existing DCI format. In another aspect, the format of the DCI may have a same size as the existing DCI format, such that the size is unchanged, though one or more bits or related parameters or fields of the DCI format may be modified to convey MB-specific information.

In method 400, at Block 404, the UE can determine that the DCI corresponds to MB communications. In an aspect, DCI detecting component 252, e.g., in conjunction with processor(s) 212, memory 216, transceiver 202, communicating component 242, etc., can determine that the DCI corresponds to MB communications. For example, DCI detecting component 252 can determine that the DCI corresponds to MB communications based on one or more of the RNTI used to scramble the DCI, an indicator in the DCI, etc. For example, the DCI can be scrambled with a RNTI to indicate MB communications, which can include specific RNTI that can be one of a MB-RNTI, G-RNTI, P-RNTI, SI-RNTI, etc., as described further herein. Based at least on detecting one of the RNTIs used to scramble the DCI, DCI detecting component 252 can determine that the DCI is for MB communications. In one example, DCI detecting component 252 can attempt to descramble the DCI based on one or more hypotheses for the RNTI, where the RNTI can be received from a base station for detecting and processing DCI for MB communications and/or for other communications. In this example, DCI detecting component 252 can determine which RNTI results in successful descrambling of the DCI (or of a CRC of the DCI), and can determine the DCI as related to MB communications where the RNTI is a certain type of RNTI, such as a MB-RNTI, or G-RNTI, where the RNTI has a certain value (e.g., which may include other RNTIs reused for MB communications, such as P-RNTI or SI-RNTI), etc.

In determining that the DCI corresponds to MB communications at Block 404, optionally at Block 406, the UE can determine that the DCI is scrambled with a MB-RNTI or G-RNTI. In an aspect, DCI detecting component 252, e.g., in conjunction with processor(s) 212, memory 216, transceiver 202, communicating component 242, etc., can determine that the DCI is scrambled with the MB-RNTI or the G-RNTI. In one example, MB-RNTIs and/or G-RNTIs can be reserved and/or defined to indicate use of a unicast DCI format (e.g., typically associated with C-RNTI) for conveying MB communications specific DCI parameters. In this example, DCI detecting component 252 can determine that one of the MB-RNTIs or G-RNTIs defined for this purpose are used to scramble the DCI, and can accordingly determine that the DCI conveys MB communications specific DCI parameters. Based on this, DCI processing component 254 can determine the DCI format, which can include determining whether the DCI format is being used for unicast or MB communications, and parameters conveyed in the DCI based on the DCI format, as described further herein. In one example, DCI format 1_0 or 1_1, as defined in 5G NR, can be used to convey the MB parameters, as described further herein.

In determining that the DCI corresponds to MB communications at Block 404, optionally at Block 408, the UE can determine, based on determining that the DCI is scrambled with the MB-RNTI, that the DCI corresponds to a MCCH. In an aspect, DCI detecting component 252, e.g., in conjunction with processor(s) 212, memory 216, transceiver 202, communicating component 242, etc., can determine, based on determining that the DCI is scrambled with the MB-RNTI, that the DCI corresponds to the MCCH. For example, the MB-RNTI can be used to indicate that the DCI corresponds to MCCH. In one example, DCI for the MTCH may be configured by the MCCH. In another example, a G-RNTI for MTCH can be configured by the MCCH, and DCI processing component 254 may determine the G-RNTI for detecting DCI for the MTCH, as described further herein. In one example, DCI detecting component 252 can receive an indication of the MB-RNTI in RRC signaling from the base station.

In determining that the DCI corresponds to MB communications at Block 404, optionally at Block 410, the UE can determine, based on determining that the DCI is scrambled with the G-RNTI, that the DCI corresponds to a MTCH. In an aspect, DCI detecting component 252, e.g., in conjunction with processor(s) 212, memory 216, transceiver 202, communicating component 242, etc., can determine, based on determining that the DCI is scrambled with the G-RNTI, that the DCI corresponds to the MTCH. For example, the G-RNTI can be used to indicate that the DCI corresponds to MTCH. As described, in one example, DCI processing component 254 can determine the G-RNTI from a previously received MCCH. In another example, DCI detecting component 252 can receive an indication of the G-RNTI in RRC signaling from the base station.

In determining that the DCI corresponds to MB communications at Block 404, optionally at Block 412, the UE can determine that the DCI is scrambled with a P-RNTI or a SI-RNTI corresponding to MB communications. In an aspect, DCI detecting component 252, e.g., in conjunction with processor(s) 212, memory 216, transceiver 202, communicating component 242, etc., can determine that the DCI is scrambled with the P-RNTI or the SI-RNTI corresponding to MB communications. For example, some available P-RNTIs or SI-RNTIs can be indicated as reserved for DCI for MB communications. In an example, DCI detecting component 252 can determine the P-RNTIs or SI-RNTIs that can be used to indicate DCI for MB communications based on an indication received from the base station, where the indication can specify which P-RNTIs or SI-RNTIs are reserved for MB communications. For example, the base station can transmit the indication to the UE 104 in RRC or other signaling, or the UE 104 can otherwise be configured with lists of one or more RNTIs that are reserved for MB communications.

For example, for a P-RNTI as defined in 5G, DCI detecting component 252 can receive a configuration (e.g., a RRC configuration from the base station 102) indicating a PagingRecord with a ue-Identity information element (IE) having a new type of PagingUE-Identity to indicate MB control or data. In one example, the P-RNTI can be used to scramble the DCI to communicate small data in the DCI (e.g., for public safety) and/or to provide DCI for receiving other downlink communications over other downlink channels. In another example, as described further herein, the DCI can include a flag to indicate that the DCI relates to MB data (e.g., and not paging). In any case, DCI detecting component 252 can detect a paging signal based on detecting scrambling with the P-RNTI, and can determine that the paging signal includes DCI for MB communications based at least in part on the P-RNTI (e.g., based on a value of the P-RNTI used to successfully decode the DCI as corresponding to a PagingUE-Identity specified as indicating MB control or data) and/or based on an indicator in the DCI.

In another example, for SI-RNTI as defined in 5G, DCI detecting component 252 can receive a configuration (e.g., a RRC configuration from the base station 102) defining a SIB (e.g., a new SIB in SystemInformation-IEs) for MB control and/or data communications. In one example, the SI-RNTI can be used to scramble the DCI, where the SI-RNTI can be associated with the new SIB to communicate small data in the DCI (e.g., for public safety or other multicast and/or broadcast services) and/or to provide DCI for receiving other downlink communications over other downlink channels. In another example, as described further herein, the DCI can include a flag to indicate that the DCI relates to MB data (e.g., and not SI). In any case, DCI detecting component 252 can detect a SIB signal based on detecting scrambling with the SI-RNTI, and can determine that the SIB signal includes DCI for MB communications based at least in part on the SI-RNTI (e.g., based on a value of the SI-RNTI used to successfully decode the DCI as corresponding to a SI-RNTI specified as indicating MB control or data), based on the associated SIB, and/or based on an indicator in the DCI.

In method 400, optionally at Block 414, the UE can determine a type of the MB communications based on a paging group or type of SIB. In an aspect, DCI detecting component 252, e.g., in conjunction with processor(s) 212, memory 216, transceiver 202, communicating component 242, etc., can determine the type of MB communications based on the paging group or type of SIB. In this example, paging groups or SIBs can be defined for different types of MB communications (e.g., different paging groups or SIBs for MCCH than for MTCH, or between types of MB services, etc.). In this example, DCI detecting component 252 can differentiate between DCI for different MB communication types based on paging group of the P-RNTI, SIB associated with the DCI, and/or the like.

In method 400, optionally at Block 416, the UE can receive an indication of MB-RNTI, G-RNTI, P-RNTI, or SI-RNTI related to MB communications. In an aspect, communicating component 242, e.g., in conjunction with processor(s) 212, memory 216, transceiver 202, etc., can receive the indication of MB-RNTI, G-RNTI, P-RNTI, or SI-RNTI related to MB communications. In one example, the base station 102 can transmit the indication of one or more of the RNTIs (e.g., values of the RNTIs that correspond to MB communications) in RRC signaling, SIB broadcast, as part of a random access procedure, and/or the like. This can allow the DCI detecting component 252 to attempt to detect communications scrambled based on one or more of the RNTIs, and determining whether the communications (e.g., DCI) relates to MB based on the RNTI used to successfully decode or descramble the communications (or a CRC thereof).

In the method 400, optionally at Block 418, the UE can determine the DCI format of the DCI that corresponds to the MB communications. In an aspect, the DCI processing component 254, e.g. in conjunction with processor(s) 212, memory 216, transceiver 202, communicating component 242, etc. can determine the DCI format of the DCI that corresponds to the MB communications. The DCI format may be specifically modified for the MB communications. For example, as described above and further herein, the DCI format may be of the same or similar size, format, etc. as an existing DCI format but modified for the purposes of MB communications. Thus, for example, DCI processing component 254 may determine the DCI format of the DCI as an existing DCI format (e.g., an existing DCI format defined in a wireless communication technology, such as 5G NR, for communications other than MB communications, such as for unicast communications, paging signals, system information signals, etc.). The determination of the DCI format may be based at least in part on a RRC operation mode, a multicast and/or broadcast service (MBS), a (specific) type of the MBS corresponding to the MB communications, etc.

In method 400, at Block 420, the UE can determine, from the DCI, one or more parameters for receiving MB communications. In an aspect, DCI processing component 254, e.g., in conjunction with processor(s) 212, memory 216, transceiver 202, communicating component 242, etc., can determine, from the DCI, one or more parameters for receiving MB communications. For example, based on determining that the DCI corresponds to MB communications, DCI processing component 254 can determine the format of the DCI as including information for receiving MB communications. For example, the determination of the DCI format may include determining that the DCI format is modified for the multicast and/or broadcast communications (e.g., modified from an existing DCI format). In an example, DCI processing component 254 can determine that the format of the DCI is modified based on determining that the DCI corresponds to MB communications.

In an aspect, the modified DCI format may include one or more different fields or parameters for indicating information for MB communications, as described further herein, and DCI processing component 254 can determine the structure of fields or parameters, as modified for MB communications, based at least in part on at least one of the RNTI used to scramble the DCI, whether the DCI includes a MB indicator, and/or the like. In an example, the determination of the DCI format may be based at least in part on a RRC operation mode, a MBS, a (specific) type of the MBS corresponding to the MB communications, etc. For example, there may be plural multicast and/or broadcast services of different types. Each of the different types of multicast and/or broadcast services may be associated with a different DCI format including one or more different fields or parameters for the multicast and/or broadcast communications. Based on the determination of the DCI format, the DCI processing component 254 may determine from the received DCI the respective one or more fields or parameters for the multicast and/or broadcast communication.

In another aspect, fields or parameters defined in an existing DCI can be modified or used differently for indicating information for MB communications, as described further herein, and DCI processing component 254 can determine the structure of fields or parameters, as modified for MB communications, based at least in part on the RNTI used to scramble the DCI, whether the DCI includes a MB indicator, and/or the like.

In determining the one or more parameters at Block 420, optionally at Block 422, the UE can determine the one or more parameters in bits defined to indicate parameters for existing communications. In an aspect, DCI processing component 254, e.g., in conjunction with processor(s) 212, memory 216, transceiver 202, communicating component 242, etc., can determine the one or more parameters in bits defined to indicate parameters for existing communications. For example, the existing communications can be non-MB communications, such as unicast communications, paging signals, SI signals, etc. Based on which RNTI is used to scramble the DCI, based on whether the DCI has a MB indicator, or the like, DCI processing component 254 can determine the one or more parameters related to MB communications in certain bits of the DCI.

For example, existing DCI format 1_0 can be used to convey the DCI with MB communication information. In one example, the DCI format 1_0 can be scrambled (e.g., the CRC can be scrambled) by MB-RNTI and/or G-RNTI. In this example, a format similar to DCI format 1_0 with CRC scrambled by C-RNTI can be used, but some existing bits defined for DCI format for unicast communications can be modified to convey MB communication information. In one example, fields in the DCI format that are non-reserved can be reserved for different (or new) fields or parameters of MB communications. For example, closed loop power control may not be used in MB communication, and thus a transmit power control (TPC) command field in the DCI format, which is a non-reserved field in the existing DCI format, can be reserved for different fields or parameters of MB communication and used to convey MB information. In one example, the TPC command field can be repurposed for additional bits for a repetition number, as MB communications can be transmitted multiple times to reach cell edge UEs. In other examples, without necessarily modifying the bit structure, fields in the existing DCI format can be used to indicate MB information, such as frequency domain resource assignment and time domain resource assignment fields used to indicate resource blocks (RBs) or other resource information in BWP or frequency region for MB (only, or for MB and unicast, etc.).

For example, a common frequency resource (e.g., BWP) for MB (e.g., for group-common PDCCH/PDSCH), as indicated in the frequency domain resource assignment field, can be shared with (e.g., defined within) the frequency resource of a dedicated unicast frequency domain resource assignment (e.g., BWP), which can allow for supporting simultaneous reception of unicast and MB communications in the same slot. In another example, a physical uplink control channel (PUCCH) resource indicator field for indicating PUCCH resources for transmitting feedback can be modified in the DCI format to indicate resources for MB (only, or for MB and unicast, etc.). In another example, a repetition number field can be added to a DCI format when specifying the modified DCI format for MB (e.g., by repurposing bits of the existing DCI format) for indicating a slot level repetition for MB (e.g., for group-common PDSCH). In yet another example, a PUCCH resource indicator field in the existing and the modified DCI format can be used to indicate PUCCH resources for MB transmissions. For example, the PUCCH resource indicator field can indicate one or more of PUCCH resources for MB only, PUCCH resources in a dedicated uplink BWP (e.g., dedicated to UE 104) that are shared by unicast and MB, or PUCCH resources in a common uplink BWP (e.g., common to multiple UEs) that are shared by unicast and MB.

A specific example of fields in the existing DCI format 1_0 scrambled by C-RNTI and modifications to include MB communication information is shown below, where modifications for MB are indicated by underline:

| Field (Item) | Bits | Reference | Note |
|---|---|---|---|
| Resource Information | | | |
| Identifier for DCI formats | 1 | Always set to 1, meaning this is for DL | reserved |
| Frequency domain resource assignment | variable | $\lceil \log_2(N_{RB}^{DL,BWP}(N_{RB}^{DL,BWP}+1)/2) \rceil$ | The number of RB in DL BWP is based on Alt1: BWP-DownlinkDedicated for MB only Alt2: at least part of BWP- |

-continued

| Field (Item) | Bits | Reference | Note |
|---|---|---|---|
| | | | DownlinkDedicated shared by unicast and MB, e.g. control resource set (CORESET) BW for MB<br>Alt3: at least part of BWP-DownlinkCommon shared by unicast and MB (for single-cell MB), e.g. CORESET BW for multicast |
| Time domain resource assignment | 4 | Carries the row index of the items in pdsch_allocationList in RRC (with max 16 rows) | Alt1: use PDSCH-TimeDomainResourceAllocation for MB only, defined in pdsch_Config of MB BWP only or shared BWP for unicast and MB<br>Alt2: use PDSCH-TimeDomainResourceAllocation shared by unicast and MB defined in pdsch_Config of dedicated BWP for both unicast and MB<br>Alt3: use PDSCH-TimeDomainResourceAllocation shared by unicast and MB, defined as part of pdsch_ConfigCommon |
| Virtual resource block (VRB)-to-physical resource block (PRB) mapping | 1 | According to 3GPP TS 38.212 Table 7.3.1.2.2-5<br>0: Non-Interleaved or<br>1: Interleaved | |

TB-related Information

| Field (Item) | Bits | Reference | Note |
|---|---|---|---|
| Modulation and coding scheme (MCS) | 5 | 3GPP TS 38.214-Table 5.1.3.1_1 MCS index table 1<br>3GPP TS 38.214-Table 5.1.3.1-2 MCS index table 2 | |
| Redundancy version (RV) | 2 | | |
| Repetition number | 0, 3 | | May use repetitions for link budget enhancement |

HARQ-related Information

| Field (Item) | Bits | Reference | Note |
|---|---|---|---|
| New data indicator (NDI) | 1 | | |
| HARQ process number | 4 | | |
| Downlink assignment index | 2 | | |
| PDSCH-to-HARQ_feedback timing indicator | 3 | maps to k1 = {1, 2, 3, 4, 5, 6, 7, 8} | |
| TPC command for scheduled PUCCH | 2 | reserved for MB | May not need closed-loop power control or use DCI format 2_2 for group TPC |
| PUCCH resource indicator | 3 | To select PUCCH resource from ResourceList within PUCCH-ResourceSet in RRC | PUCCH-ResourceSet for MB (e.g., for group NACK for multicast)<br>Alt1: define in pucch_Config belonging to BWP-UplinkMulticast for MB only<br>Alt2: defined in pucch_Config belonging to BWP-UplinkDedicated shared by unicast and MB<br>Alt3: defined in pucch_ConfigCommon belonging to BWP-UplinkCommon shared by unicast and MB (for single-cell MB) |

In any case, DCI processing component 254 can determine that the DCI format corresponds to MB communications and can accordingly determine the parameters in the modified structure of the DCI (e.g., which bits in the DCI correspond to which parameters) based on determining the DCI format for MB communications.

In another example, the existing DCI format 1_0 can be scrambled (e.g., the CRC can be scrambled) by P-RNTI, but some existing bits defined for DCI format for paging signals can be modified to convey MB communication information. As described in an example, in RRC, a group UE ID can be used in the ue-Identity field (IE) as a new type of PagingUE-Identity, and this new type of PagingUE-Identity can be used to indicate MB control or data (e.g., small data for public safety):

```
PagingRecord ::= SEQUENCE {
  ue-Identity PagingUE-Identity,
  * accessType ENUMERATED {non3GPP} OPTIONAL, -- Need N ...
}
...
PagingUE-Identity ::= CHOICE {
  ng-5G-S-TMSI NG-5G-S-TMSI,
  fullI-RNTI I-RNTI-Value, ...
  mb-RNTI MB-RNTI-Value, ...
}
```

In DCI, a reserved bit can be used, or repurposed, as a new field for MB communications, such as a flag to differentiate paging and MB data for an early indication of MB data. The UEs supporting MB can accordingly determine that the DCI is for MB earlier before detecting the paging message in PDSCH. In one example, reserved bits of this format can be used to convey MB information, such as one or more new fields for MB communications that may include a MB indication to indicate whether the DCI is of the MB format, a repetition number, as MB communications can be transmitted multiple times to reach cell edge UEs, etc. In other examples, without necessarily modifying the bit structure, fields in the existing DCI format can be used to indicate MB information, such as frequency domain resource assignment and time domain resource assignment fields used to indicate resource blocks (RBs) or other resource information in BWP for MB (only, or for MB and unicast paging, etc.). A specific example of fields in the existing DCI format 1_0 scrambled by P-RNTI and modifications to include MB communication information is shown below, where modifications for MB are indicated by underline:

| Field (Item) | Bits | Reference | Note |
|---|---|---|---|
| Short Message Indicator | 2 | | May be used for NR MB control message update |
| Short Message | 8 | | May be used for NR MB control message update |
| Frequency domain resource assignment | variable | $\lceil \log_2(N_{RB}^{DL,BWP}(N_{RB}^{DL,BWP}+1)/2) \rceil$ | The number of RB in DL BWP is based on at least part of BWP-DownlinkCommon shared by unicast paging and MB (for single-cell MB) |
| Time domain resource assignment | 4 | Carries the row index of the items in pdsch_allocationList in RRC (with max 16 rows) | use PDSCH-TimeDomainResourceAllocation shared by unicast and MB, defined as part of in BWP-DownlinkCommon for unicast paging and multicast data |
| VRB-to-PRB mapping | 1 | According to 38.212 Table 7.3.1.2.2-5 0: Non-Interleaved or 1: Interleaved | |
| Modulation and coding scheme | 5 | 38.214-Table 5.1.3.1_1 MCS index table 1 38.214-Table 5.1.3.1-2 MCS index table 2 | |
| Redundancy version | 2 | | |
| Repetition number | 0, 3 | | May need repetitions for block error rate (BLER) enhancement |
| TB scaling | 2 | | |
| Multicast indication | 1 | Indicate whether paging or mutlicast, set '1' when MB is transmitted | Can be extended to more than 1 bit for different types of MB |
| Reserved | 5, 2 | | |

In any case, DCI processing component 254 can determine that the DCI format corresponds to MB communications and can accordingly determine the parameters in the DCI (e.g., which bits in the DCI correspond to which parameters) based on the DCI format for MB communications.

In another example, the existing DCI format 1_0 can be scrambled (e.g., the CRC can be scrambled) by SI-RNTI, but some existing bits defined for DCI format for paging signals can be modified to convey MB communication information. As described in an example, in RRC, a new type of SIB can be defined in RRC for MB control or data (e.g., small data for public safety):

```
SystemInformation-IEs ::= SEQUENCE {
    sib-TypeAndInfo SEQUENCE (SIZE(1..maxSIB)) OF
        CHOICE { sib2 SIB2, sib3 SIB3, sib4 SIB4, sib5 SIB5, sib6 SIB6,
    sib7 SIB7, sib8 SIB8, sib9 SIB9,... sibX SIBX, ... },
```

-continued

```
    * lateNonCriticalExtension OCTET STRING OPTIONAL,
    * nonCriticalExtension SEQUENCE { } OPTIONAL
}
```

In DCI, a reserved bit can be used as a flag to differentiate SIB and MB data for an early indication of MB data. The UEs supporting MB can accordingly determine that the DCI is for MB earlier before detecting the SIB in PDSCH. In one example, reserved bits of this format can be used to convey MB information, such as a MB indication to indicate whether the DCI is of the MB format, a repetition number, as MB communications can be transmitted multiple times to reach cell edge UEs, etc. In other examples, without necessarily modifying the bit structure, fields in the existing DCI format can be used to indicate MB information, such as frequency domain resource assignment and time domain resource assignment fields used to indicate resource blocks (RBs) or other resource information in BWP for MB (only, or for MB and unicast paging, etc.). A specific example of fields in the existing DCI format 1_0 scrambled by SI-RNTI and modifications to include MB communication information is shown below, where modifications for MB are indicated by underline:

| Field (Item) | Bits | Reference | Note |
|---|---|---|---|
| Frequency domain resource assignment | variable | $\lceil \log_2(N_{RB}^{DL,BWP}(N_{RB}^{DL,BWP}+1)/2) \rceil$ | The number of RB in DL BWP is based on at least part of BWP-DownlinkCommon shared by SIB and MB (for single-cell MB) |
| Time domain resource assignment | 4 | Carries the row index of the items in pdsch_allocationList in RRC (with max 16 rows) | use PDSCH-TimeDomainResourceAllocation shared by unicast and MB, defined as part of in BWP-DownlinkCommon for SIB and MB |
| VRB-to-PRB mapping | 1 | According to 38.212 Table 7.3.1.2.2-5<br>0: Non-Interleaved or<br>1: Interleaved | |
| Modulation and coding scheme | 5 | 38.214-Table 5.1.3.1 1 MCS index table 1<br>38.214-Table 5.1.3.1-2 MCS index table 2 | |
| Redundancy version | 2 | | |
| Repetition number | 0, 3 | | May need repetitions for BLER enhancement |
| System information indicator | 1 | 0: SIB1 or 1: SI messages | reserved if MB is transmitted |
| Multicast indication | 1 | Indicate whether SIB or mutlicast, set '1' when MB is transmitted | Can be extended to more than 1 bit for different types of MB |
| Reserved | 14 or 11 | | |

In any case, DCI processing component 254 can determine that the DCI format corresponds to MB communications and can accordingly determine the parameters in the DCI (e.g., which bits in the DCI correspond to which parameters) based on the DCI format for MB communications.

In another example, existing DCI format 1_1 can be used to convey the DCI with MB communication information. In one example, the DCI format 1_1 can be scrambled (e.g., the CRC can be scrambled) by MB-RNTI and/or G-RNTI. In this example, a format similar to DCI format 1_1 with CRC scrambled by C-RNTI can be used, but some existing bits defined for DCI format for unicast communications can be modified to convey MB communication information. In one example, various fields may not be used in MB communication, such as an identifier for DCI formats, carrier indicator, BWP indicator, VRB-to-PRB mapping, PRB bundling size indicator, second transport block (TB2) information, TPC command, antenna ports and/or number of layers, sounding reference signal (SRS) request, etc., and thus the associated fields, which are non-reserved in the DCI format, can be reserved or used to convey MB information. In one example, the bits associated with such fields can be repurposed for additional bits for a repetition number, as MB communications can be transmitted multiple times to reach cell edge UEs, or other MB information. In other examples, without necessarily modifying the bit structure, fields in the existing DCI format can be used to indicate MB information, such as frequency domain resource assignment and time domain resource assignment fields used to indicate resource blocks (RBs) or other resource information in BWP or frequency region for MB (only, or for MB and unicast, etc.), code block group (CBG) flush indicator (CBGFI), CBG transmission indicator (CBGTI), or a physical uplink control channel (PUCCH) resource indicator indicating PUCCH resources for transmitting feedback for MB (only, or for MB and unicast, etc.). A specific example of fields in the existing DCI format 1_1 scrambled by C-RNTI and modifications to include MB communication information is shown below, where modifications for MB are indicated by underline (for additions or changes) and strikethrough (for deletions):

| Field (Item) | Bits | Reference | Note |
|---|---|---|---|
| Resource Information | | | |
| Identifier for DCI formats | ~~1~~ | Reserved for MB | Always set to 1, meaning this is for DL |
| Carrier indicator | 0,~~3~~ | Reserved for MB | May not need to use MB DCI format 1_1 for dynamic carrier switching. Not all devices receiving MB are capable of carrier aggregation |
| BWP indicator | 0,~~1,2~~ | Reserved for MB | May not need to use MB DCI format 1_1 for dynamic BWP switching |
| Frequency domain resource assignment | variable | $\lceil \log_2(N_{RB}^{DL,BWP}(N_{RB}^{DL,BWP}+1)/2) \rceil$ | The number of RB in DL BWP is based on Alt1: BWP-DownlinkDedicated for MB only Alt2: at least part of BWP-DownlinkDedicated shared by unicast and MB, e.g., CORESET BW for MB |
| Time domain resource assignment | 4 | Carries the row index of the items in pdsch_allocationList in RRC (with max 16 rows) | Alt1: use PDSCH-TimeDomainResourceAllocation for MB only, defined in pdsch_Config of MB BWP only or shared BWP for unicast and MB. Alt2: use PDSCH-TimeDomainResourceAllocation shared by unicast and MB, defined in pdsch_Config of dedicated BWP for both unicast and MB |
| VRB-to-PRB mapping | 0,~~1~~ | Reserved for MB | 0 bit if only resource allocation type 0 is configured or if interleaved VRB-to-PRB mapping is not configured by high layers; 1 bit according to Table 7.3.1.1.2-33 otherwise, only applicable to resource allocation type 1 |
| PRB bundling size indicator | 0,~~1,2~~ | Reserved for MB | May not need to use dynamic bundling size for MB. 0 bit if the higher layer parameter prb-BundlingType is not configured or is set to 'static' 1 bit if the higher layer parameter prb-BundlingType is set to 'dynamic' |

-continued

| Field (Item) | Bits | Reference | Note |
|---|---|---|---|
| Rate matching indicator | 0, 1, 2 | Bit size is determined by higher layer parameters rateMatchPatternGroup1 and rateMatchPatternGroup2. | |
| Zero power (ZP) channel state information reference signal (CSI-RS) trigger . . . | 0, 1, 2 | | |
| TB-related Information | | | |
| MCS [TB1] | 5 | | |
| RV [TB1] | 2 | | |
| NDI [TB1] | 1 | | |
| Repetition number [TB1] | 0, 3 | | May need repetitions for BLER enhancement |
| MCS [TB2] | 5 | Reserved for MB | May not need TB2 for MB |
| RV [TB2] | 2 | Reserved for MB | |
| NDI [TB2] | 1 | Reserved for MB | |
| HARQ-related Information | | | |
| HARQ process number | 4 | | |
| Downlink assignment index | 2 | | |
| PDSCH-to-HARQ_feedback timing indicator | 0, 1, 2, 3 | maps to k1 = {1, 2, 3, 4 ,5 , 6, 7, 8} | Number of bit is determined by log2(I). 'I' is the number of elements in the IE PUCCH-Config.dl-DataToUL-ACK |
| CBGTI | 0, 2, 4, 6, 8 | | CBG may be independently configured for MB |
| CBGFI | 0, 1 | | CBG may be independently configured for MB |
| TPC command for scheduled PUCCH | 2 | reserved for MB | May not need closed-loop power control or use DCI format 2_2 for group TPC |
| PUCCH resource indicator | 3 | To select PUCCH resource from ResourceList within PUCCH-ResourceSet in RRC | PUCCH-ResourceSet for MB (e.g., for group NACK for MB) Alt1: define in pucch_Config belonging to BWP-UplinkMB for MB only Alt2: defined in pucch_Config belonging to BWP-UplinkDedicated shared by unicast and MB |
| MIMO-related Information | | | |
| Antenna port(s) and number of layers | 4, 5, 6 | Reserved for MB | May not need multi-layer transmission for MB |
| Transmission configuration indication (TCI) | 0, 3 | 0 bit if higher layer parameter tci-PresentInDCI is not enabled; 3 bits otherwise | TCI states may be independently configured for multicast, e.g., single frequency network (SFN)-based MB |
| SRS request | 2 | Reserved for MB | May not need SRS request for a group of UEs |
| Demodulation reference signal (DMRS) sequence initialization | 1 | | |

In any case, based on the RNTI, the DCI format (e.g., as 1_0 or 1_1), the MB indicator, etc., DCI processing component 254 can determine the format of the DCI as including MB information and can accordingly process the DCI to determine information related to receiving the MB communications.

In method 400, optionally at Block 424, the UE can determine a type of the MB communications based on an indicator in the DCI. In an aspect, DCI processing component 254, e.g., in conjunction with processor(s) 212, memory 216, transceiver 202, communicating component 242, etc., can determine the type of the MB communication based on the indicator in the DCI. As described above, more than one bit can be used for a MB indicator, and in this example, different values can be used to indicate different types of the MB communications (e.g., MCCH, MTCH, specific types of MB, etc.) corresponding to the DCI.

In another example, in determining the one or more parameters at Block 420, optionally at Block 426, the UE can determine whether resources for transmitting feedback for the MB communications are activated. In an aspect, DCI processing component 254, e.g., in conjunction with processor(s) 212, memory 216, transceiver 202, communicating component 242, etc., can determine whether resources for transmitting feedback for the MB communications are activated. For example, DCI processing component 254 can determine whether PUCCH resources typically indicated by the PUCCH resource indicator field in the DCI format are activated for a given MB service. If not, for example, these bits in the DCI format can be reused for MB communication information. For example, where the MB does not have HARQ-ACK for any user, these fields are not needed and can be repurposed or otherwise removed to reduce size of the DCI (as described further herein). Where the MB has HARQ-acknowledgement (ACK) for some users, but not for a given UE, these fields can be ignored. Where the MB has HARQ-ACK for some users, and a given UE is activated for HARQ-ACK, these fields can be used to indicate the PUCCH resources for feedback (e.g., for MB and/or as shared with unicast).

In an example, in method 400, optionally at Block 428, the UE can receive an indication of whether resources for transmitting feedback for MB communications are activated. In an aspect, DCI processing component 254, e.g., in conjunction with processor(s) 212, memory 216, transceiver 202, communicating component 242, etc., can receive the indication of whether resources for transmitting feedback for the MB communications are activated (e.g., for a given MB service, for a given UE, etc.). For example, a flag can be provided in RRC or MCCH to indicate whether the fields for HARQ-ACK are indicated in DCI or not. In this example, DCI processing component 254 can receive the flag and determine whether the fields are activated. Based on this determination, for example, communicating component 242 can rate match or pad to keep the size of DCI 1_0 or 1_1 same as existing to avoid additional blind detection. In another example, shortened DCI formats can be introduced without including the fields for HARQ-ACK. In this example, the UE can receive a configuration in RRC about which DCI formats are used for MB depending on the UE capability, which is described further herein. In another example, DCI processing component 254 can determine whether resources for transmitting feedback are present in the DCI based on presence or value of one or more bits of the DCI (e.g., in the PUCCH resource indicator field or otherwise).

In another example, in determining the one or more parameters at Block 420, DCI processing component 254 can select the DCI format for MB based on one or more of the following scenarios. In one example, a flag can be provided in RRC or MCCH to indicate which DCI format is selected for UE to monitor MB transmission. For example, MB DCI based on DCI format 1_1 can be selected to support the SFN-based MB transmission, where the non-cell-specific TCI state can be indicated by using indicator in DCI format 1_1. In this example, DCI processing component 254 can receive the flag and accordingly determine that DCI format 1_1 is selected, and can also determine the non-cell-specific TCI state in the DCI format 1_1 (e.g., such to determine a quasi-colocation relationship between downlink reference signals and antenna ports). In another example, the selected DCI format can be defined based on an operation mode (e.g., an RRC operation mode). For example, DCI processing component 254 may determine to use DCI format 1_0 for MB DCI when operating in an RRC_IDLE or RRC_INACTIVE mode, DCI format 1_0 or DCI format 1_1 for MB DCI when operating in RRC_CONNECTED mode. Alternatively, in an example, the selected DCI format can be defined based on the MB which may have different traffic load and/or QoS requirement, e.g., DCI processing component 254 may determine or select DCI format 1_0 for MB traffic with low data rate, etc.

In method 400, optionally at Block 430, e.g., where the UE is in an idle or inactive mode (e.g., RRC_IDLE or RRC_INACTIVE mode) the UE can transition, based on determining that the DCI corresponds to MB communication, to a connected mode (e.g., RRC_CONNECTED mode). In an aspect, communicating component 242, e.g., in conjunction with processor(s) 212, memory 216, transceiver 202, etc., can transition, based on determining that the DCI corresponds to MB communications, to the connected mode to receive the MB communications.

In method 400, at Block 432, the UE can receive, based on the one or more parameters, the MB communications. In an aspect, communicating component 242, e.g., in conjunction with processor(s) 212, memory 216, transceiver 202, etc., can receive, based on the one or more parameters determined from the DCI based on the DCI format for MB, the MB communications. For example, communicating component 242 can receive the MB communications over frequency and/or time resources indicated in one or more parameters of the DCI, based on a MCS indicated in the DCI, based on a repetition number indicated in the DCI (e.g., to combine communications for improved reception), etc. For example, where, in determining the one or more parameters at Block 420, the DCI detecting component 252 determines the DCI format is modified for MB communications, communicating component 242 can receive the MB communications according to the modified DCI format.

In method 400, optionally at Block 434, the UE can transmit feedback for the MB communications based on determined resources for transmitting the feedback. In an aspect, communicating component 242, e.g., in conjunction with processor(s) 212, memory 216, transceiver 202, etc., can transmit feedback for the MB communications based on determined resources for transmitting the feedback (e.g., as determined at Block 426 and/or received at Block 428). The feedback can include at least one of ACK to indicate the MB communications are received or successfully decoded or NACK to indicate the MB communications are not received or successfully decoded. In one example, the resources used for transmitting the feedback can be based on whether the feedback is NACK, and/or may include resources that are specific for MB or are shared between unicast and MB, as described.

Figure 5:
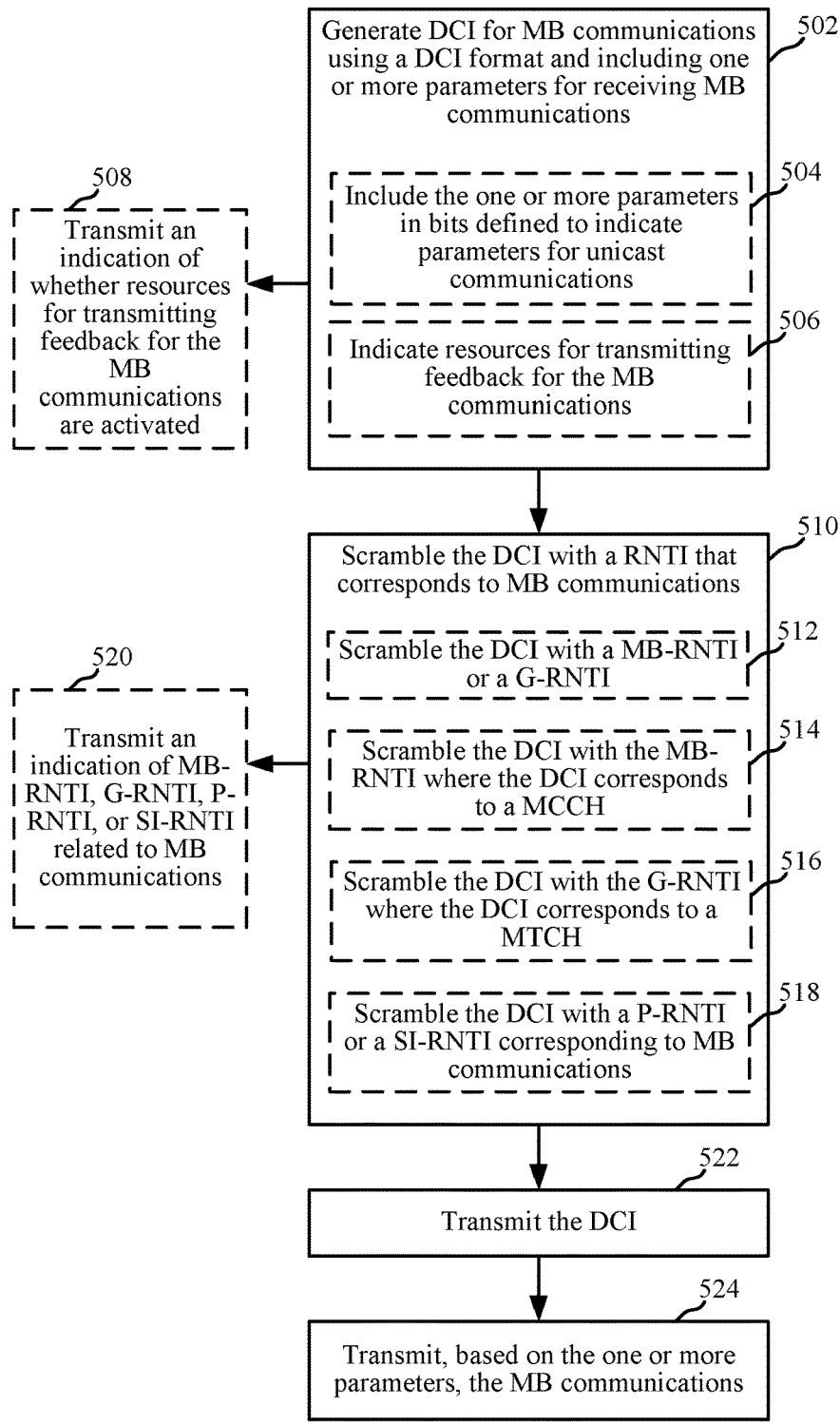
FIG. 5 is a flow chart illustrating an example of a method for generating DCI for MB communications using an existing DCI format, in accordance with various aspects of the present disclosure.

FIG. 5 illustrates a flow chart of an example of a method 500 for generating DCI for MB communications. In an example, a base station 102 can perform the functions described in method 500 using one or more of the components described in FIG. 1 or 3.

In method 500, at Block 502, the base station can generate DCI for MB communications using a DCI format and including one or more parameters for receiving MB communications. In an aspect, DCI generating component 352, e.g., in conjunction with processor(s) 312, memory 316, transceiver 302, scheduling component 342, etc., can generate DCI for MB communications using the DCI format and including one or more parameters for receiving MB communications. For example, DCI generating component 352 can generate the DCI using an existing DCI format, such as DCI for unicast communications, DCI for paging signals, DCI for SI signals, etc., as described above. In addition, in an example, the DCI for MB communications may be generated to have the same format as the existing DCI format based on having a same size as the existing DCI format, though one or more bits or related parameters or fields may be modified to convey MB-specific information.

In generating the DCI for MB communications at Block 502, optionally at Block 504, the base station can include one or more parameters in bits defined to indicate parameters for unicast communications. In an aspect, DCI generating component 352, e.g., in conjunction with processor(s) 312, memory 316, transceiver 302, scheduling component 342, etc., can include the one or more parameters in bits defined to indicate parameters for unicast communications. As described above, DCI generating component 352 can generate the DCI based on an existing DCI format 1_0 for transmitting unicast communications (e.g., CRC scrambled with C-RNTI), an existing DCI format 1_0 for transmitting paging signals (e.g., CRC scrambled with P-RNTI), an existing DCI format 1_0 for transmitting SI signals (e.g., CRC scrambled with SI-RNTI), an existing DCI format 1_1 for transmitting unicast communications (e.g., CRC scrambled with C-RNTI), etc. In an example, DCI generating component 352 can modify bits, as described above, to repurpose or reserve bits for indicating MB communication information. In addition, for example, the bits or fields used to indicate MB communication information can be based on whether the DCI format is DCI format 1_0 corresponding to unicast communication, paging signals, or system information signals, or DCI format 1_1 corresponding to unicast communications. As described, for example, the one or more parameters may include a repetition number, an indication of frequency and/or time resources for the MB communications, a MB indicator (indicating presence and/or type of MB communications), feedback resource indicator, etc.

In an example, in generating the DCI for MB communications at Block 502, optionally at Block 506, the base station can indicate resources for transmitting feedback for the MB communications. In an aspect, DCI generating component 352, e.g., in conjunction with processor(s) 312, memory 316, transceiver 302, scheduling component 342, etc., can indicate the resources for transmitting feedback for the MB communications. For example, as described, DCI generating component 352 can indicate resources are reserved for transmitting feedback based on another indication of whether the resources are activated. If so, for example, DCI generating component 352 can use the PUCCH resource indicator portion of the DCI format to indicate the resources. If not, DCI generating component 352 can use bits of the PUCCH resource indicator portion to indicate other MB communication information. In another example, described further herein, DCI generating component 352 can remove the PUCCH resource indicator portion to shorten the DCI format.

In method 500, optionally at Block 508, the base station can transmit an indication of whether resources for transmitting feedback for the MB communications are activated. In an aspect, DCI generating component 352, e.g., in conjunction with processor(s) 312, memory 316, transceiver 302, scheduling component 342, etc., can transmit the indication of whether resources for transmitting feedback for the MB communications are activated. As described, DCI generating component 352 can transmit the indication as a flag in RRC or MCCH, where rate matching or padding can be used to keep the size of the DCI format 1_0 or 1_1 for MB communications to be the same size as the existing DCI format 1_0 or 1_1 for unicast communications to avoid additional blind detection.

In method 500, at Block 510, the base station can scramble the DCI with a RNTI that corresponds to MB communications. In an aspect, DCI generating component 352, e.g., in conjunction with processor(s) 312, memory 316, transceiver 302, scheduling component 342, etc., can scramble the DCI (e.g., scramble the CRC of the DCI) with the RNTI that corresponds to MB communications.

In one example, in scrambling the DCI with the RNTI, at Block 510, optionally at Block 512, the base station can scramble the DCI with a MB-RNTI or a G-RNTI. In an aspect, DCI generating component 352, e.g., in conjunction with processor(s) 312, memory 316, transceiver 302, scheduling component 342, etc., can scramble the DCI with the MB-RNTI or the G-RNTI. In this example, the DCI can be of existing DCI format 1_0 or DCI format 1_1 as usually scrambled with C-RNTI, but can be scrambled with MB-RNTI or G-RNTI to indicate that the DCI includes MB communication information, as described.

In another example, in scrambling the DCI with the RNTI, at Block 510, optionally at Block 514, the base station can scramble the DCI with the MB-RNTI where the DCI corresponds to a MCCH. In an aspect, DCI generating component 352, e.g., in conjunction with processor(s) 312, memory 316, transceiver 302, scheduling component 342, etc., can scramble the DCI with the MB-RNTI where the DCI corresponds to the MCCH. In this regard, the UE 104 receiving the DCI can determine that the DCI corresponds to MCCH based on detecting the MB-RNTI used to scramble the DCI.

In another example, in scrambling the DCI with the RNTI, at Block 510, optionally at Block 516, the base station can scramble the DCI with the G-RNTI where the DCI corresponds to a MTCH. In an aspect, DCI generating component 352, e.g., in conjunction with processor(s) 312, memory 316, transceiver 302, scheduling component 342, etc., can scramble the DCI with the G-RNTI where the DCI corresponds to the MTCH. In this regard, the UE 104 receiving the DCI can determine that the DCI corresponds to MTCH based on detecting the G-RNTI used to scramble the DCI.

In another example, in scrambling the DCI with the RNTI, at Block 510, optionally at Block 518, the base station can scramble the DCI with the P-RNTI or a SI-RNTI corresponding to MB communications. In an aspect, DCI generating component 352, e.g., in conjunction with processor(s) 312, memory 316, transceiver 302, scheduling component 342, etc., can scramble the DCI with the P-RNTI or the SI-RNTI corresponding the MB communications (e.g., using a value for the P-RNTI or SI-RNTI that is specified for use to indicate multicast communications). For example, as described, DCI generating component 352 can scramble the DCI with a P-RNTI corresponding to a group UE identifier as a new PagingUE-Identity type correspond to MB communications. In another example, as described, DCI generating component 352 can scramble the DCI with a SI-RNTI corresponding to a new SIB for indicating MB communications. In addition, as described above, different paging identity types and/or SIB types can be generated for different MB communication types (e.g., MCCH, MTCH, or different MB), and the UE 104 can use the paging identity type of the P-RNTI, the SIB associated with the SI-RNTI or DCI, etc., to determine the type of MB communications.

In method 500, optionally at Block 520, the base station can transmit an indication of MB-RNTI, G-RNTI, P-RNTI, or SI-RNTI related to MB communications. In an aspect, DCI generating component 352, e.g., in conjunction with processor(s) 312, memory 316, transceiver 302, scheduling component 342, etc., can transmit an indication of MB-RNTI, G-RNTI, P-RNTI, or SI-RNTI related to MB communications, as described, to indicate the various RNTIs to the UE 104 for determining, based on detecting RNTI used to scramble the DCI, whether the DCI includes MB communication information. For example, DCI generating component 352 can transmit the indication of MB-RNTI, G-RNTI, P-RNTI, or SI-RNTI related to MB communications using system information broadcast (e.g., in one or more SIBs), using RRC signaling, etc.

In method 500, at Block 522, the base station can transmit the DCI. In an aspect, scheduling component 342, e.g., in conjunction with processor(s) 312, memory 316, transceiver 302, etc., can transmit the DCI. For example, scheduling component 342 can transmit the DCI, using the DCI format, and in a search space (e.g., CSS, USS, etc.) for a control channel (PDCCH), where a UE 104 can receive signals in the search space and attempt to descramble based on one or more RNTIs, as described.

In method 500, at Block 524, the base station can transmit, based on the one or more parameters, the MB communications. In an aspect, scheduling component 342, e.g., in conjunction with processor(s) 312, memory 316, transceiver 302, etc., can transmit, based on the one or more parameters, the MB communications. For example, scheduling component 342 can transmit the MB communications over frequency and/or time resources indicated in one or more parameters of the DCI, based on a MCS indicated in the DCI, based on a repetition number indicated in the DCI (e.g., to combine communications for improved reception), etc.

Figure 6:
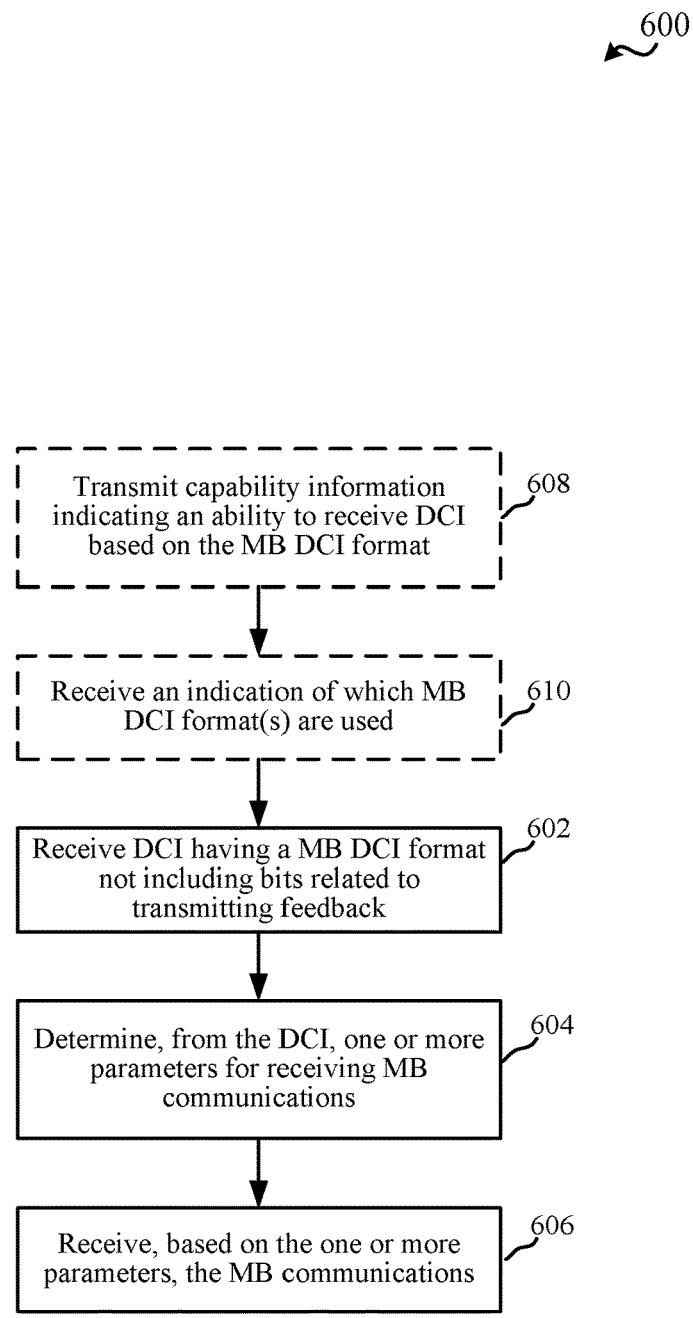
FIG. 6 is a flow chart illustrating an example of a method for detecting MB DCI defined for MB communications, in accordance with various aspects of the present disclosure.

FIG. 6 illustrates a flow chart of an example of a method 600 for receiving MB DCI for MB communications. In an example, a UE 104 can perform the functions described in method 600 using one or more of the components described in FIGS. 1-2.

In method 600, at Block 602, the UE can receive DCI having a MB DCI format not including bits related to transmitting feedback. In an aspect, DCI detecting component 252, e.g., in conjunction with processor(s) 212, memory 216, transceiver 202, communicating component 242, etc., can receive the DCI having the MB DCI format not including bits related to transmitting feedback. In an example, DCI detecting component 252 can detect the DCI in a search space defined for a control channel (e.g., a CSS, USS, etc., defined for a PDCCH). Moreover, for example, the DCI may be similar to an existing format defined in a wireless communication technology (e.g., 5G NR) for other types of communications that may not include MB communications, such as DCI formats for unicast communications, but not including bits related to transmitting feedback (e.g., not including PUCCH resource indicator or other HARQ-related fields). In this regard, the DCI can be shortened to conserve signaling resources where the feedback-related bits/fields are not needed. In one example, DCI detecting component 252 may also determine a RNTI used to scramble the DCI (e.g., MB-RNTI, G-RNTI, etc., as described) and/or can accordingly descramble the DCI.

In method 600, at Block 604, the UE can determine, from the DCI, one or more parameters for receiving MB communications. In an aspect, DCI processing component 254, e.g., in conjunction with processor(s) 212, memory 216, transceiver 202, communicating component 242, etc., can determine, from the DCI, one or more parameters for receiving MB communications. For example, based on determining that the DCI corresponds to MB communications, DCI processing component 254 can determine the MB DCI format of the DCI as not including the bits related to transmitting feedback.

In method 600, at Block 606, the UE can receive, based on the one or more parameters, the MB communications. In an aspect, communicating component 242, e.g., in conjunction with processor(s) 212, memory 216, transceiver 202, etc., can receive, based on the one or more parameters, the MB communications. For example, communicating component 242 can receive the MB communications over frequency and/or time resources indicated in one or more parameters of the DCI, based on a MCS indicated in the DCI, based on a repetition number indicated in the DCI (e.g., to combine communications for improved reception), etc.

In method 600, optionally at Block 608, the UE can transmit capability information indicating an ability to receive DCI based on the MB DCI format. In an aspect, communicating component 242, e.g., in conjunction with processor(s) 212, memory 216, transceiver 202, etc., can transmit the capability information indicating the ability to receive the DCI based on the MB DCI format. In an example, a base station 102 can transmit the DCI having the MB DCI format based on the capability information. For example, communicating component 242 can transmit the capability information in RRC or other signaling to the base station 102.

In method 600, optionally at Block 610, the UE can receive an indication of which MB DCI format(s) are used. In an aspect, communicating component 242, e.g., in conjunction with processor(s) 212, memory 216, transceiver 202, etc., can receive (e.g., from the base station 102) an indication of which MB DCI format(s) are used (e.g., by the base station 102 to indicate DCI for MB communications). DCI detecting component 252 can accordingly attempt to detect the MB DCI format(s), which may include the shortened DCI formats without feedback-related bits/fields, in the search space. For example, communicating component 242 can receive the indication from the base station 102 in RRC or other signaling.

Figure 7:
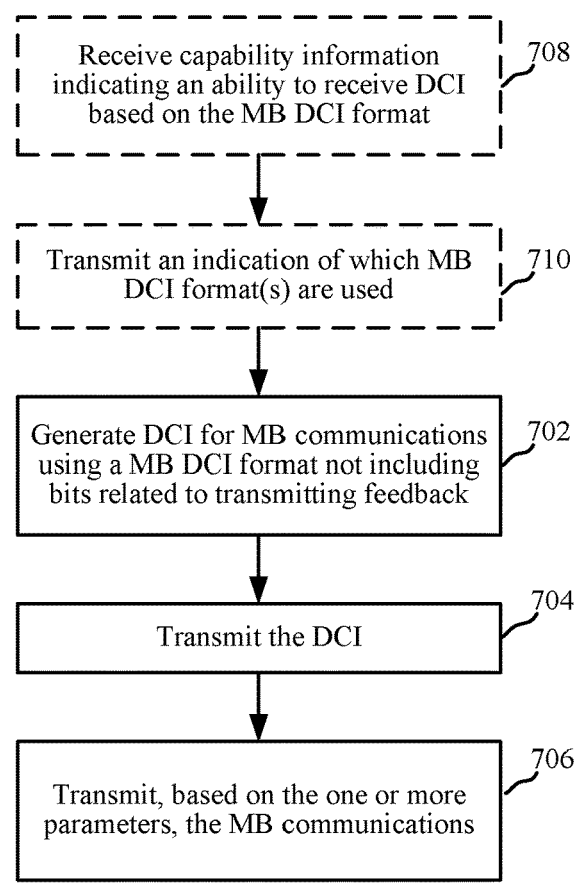
FIG. 7 is a flow chart illustrating an example of a method for generating MB DCI defined for MB communications, in accordance with various aspects of the present disclosure.

FIG. 7 illustrates a flow chart of an example of a method 700 for generating MB DCI for MB communications. In an example, a base station 102 can perform the functions described in method 700 using one or more of the components described in FIG. 1 or 3.

In method 700, at Block 702, the base station can generate DCI for MB communications using a MB DCI format not including bits related to transmitting feedback. In an aspect, DCI generating component 352, e.g., in conjunction with processor(s) 312, memory 316, transceiver 302, scheduling component 342, etc., can generate DCI for MB communications using a MB DCI format not including bits related to transmitting feedback. For example, the DCI may be similar to an existing format defined in a wireless communication technology (e.g., 5G NR) for other types of communications that may not include MB communications, such as DCI formats for unicast communications, but not including bits related to transmitting feedback (e.g., not including PUCCH resource indicator or other HARQ-related fields). In this regard, the DCI can be shortened to conserve signaling resources where the feedback-related bits/fields are not needed.

In method 700, at Block 704, the base station can transmit the DCI. In an aspect, scheduling component 342, e.g., in conjunction with processor(s) 312, memory 316, transceiver 302, etc., can transmit the DCI based in the DCI format. In an example, DCI generating component 352 can scramble the DCI with a RNTI, as described, which may include a MB-RNTI, G-RNTI, etc. For example, scheduling component 342 can transmit the DCI in a search space (e.g., CSS, USS, etc.) for a control channel (PDCCH), where a UE 104 can receive signals in the search space and attempt to descramble based on one or more RNTIs, as described.

In method 700, at Block 706, the base station can transmit, based on the one or more parameters, the MB communications. In an aspect, scheduling component 342, e.g., in conjunction with processor(s) 312, memory 316, transceiver 302, etc., can transmit, based on the one or more parameters, the MB communications. For example, scheduling component 342 can transmit the MB communications over frequency and/or time resources indicated in one or more parameters of the DCI, based on a MCS indicated in the DCI, based on a repetition number indicated in the DCI (e.g., to combine communications for improved reception), etc.

In method 700, optionally at Block 708, the base station can receive capability information indicating an ability to receive DCI based on the MB DCI format. In an aspect, scheduling component 342, e.g., in conjunction with processor(s) 312, memory 316, transceiver 302, etc., can receive the capability information indicating the ability to receive the DCI based on the MB DCI format. In an example, scheduling component 342 can receive the capability information from the UE 104, which can be based on a request for capability information, etc. For example, scheduling component 342 can receive the capability information in RRC or other signaling from the UE 104. In any case, base station 102 can transmit the DCI having the MB DCI format based on the capability information.

In method 700, optionally at Block 710, the base station can transmit an indication of which MB DCI format(s) are used. In an aspect, scheduling component 342, e.g., in conjunction with processor(s) 312, memory 316, transceiver 302, etc., can transmit (e.g., to UE 104) an indication of which MB DCI format(s) are used (e.g., by the base station 102 to indicate DCI for MB communications). For example, scheduling component 342 can transmit the indication in RRC or other signaling to the UE 104. DCI generating component 352 can accordingly generate DCI for MB communications based on the indicated MB DCI format(s), which may include the shortened DCI formats without feedback-related bits/fields, in the search space.

Figure 8:
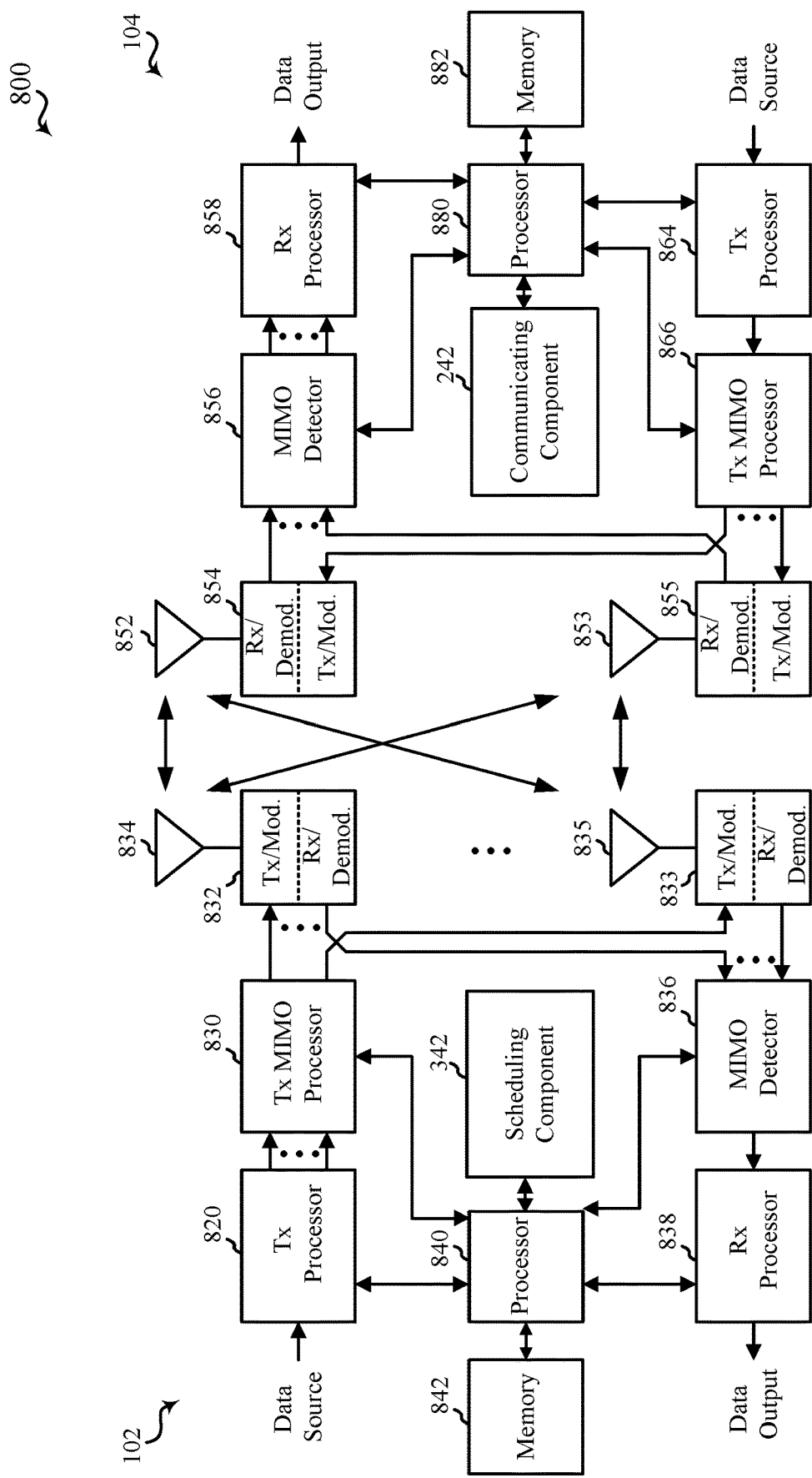
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a scheduling component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 800. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 is a method for wireless communication including receiving DCI of a DCI format, determining, based at least in part on a RNTI used to scramble the DCI, that the DCI corresponds to MB communications, determining the DCI format of the DCI corresponding to the MB communications, wherein the DCI format is modified for the MB communications, determining, from the DCI, one or more parameters associated with one or more fields of the modified DCI format for receiving the MB communications, and receiving, based on the one or more parameters, the MB communications.

In Aspect 2, the method of Aspect 1 includes wherein a size of the modified DCI format is unchanged.

In Aspect 3, the method of any of Aspects 1 or 2 includes wherein the one or more parameters are determined based on a configuration that is for multicast only, or is a dedicated configuration shared by unicast and multicast, or is a common configuration shared by unicast and multicast.

In Aspect 4, the method of Aspect 3 includes wherein the one or more fields comprise a frequency domain resource assignment, wherein the one or more parameters comprise a number of resource blocks, and wherein the configuration is a downlink BWP configuration.

In Aspect 5, the method of any of Aspects 3 or 4 includes wherein the one or more fields comprise a time domain resource assignment, wherein the one or more parameters comprise a time domain resource allocation for a PDSCH, and wherein the configuration is a PDSCH configuration.

In Aspect 6, the method of any of Aspects 3 to 5 includes wherein the one or more fields comprise a resource indicator for PUCCH, wherein the one or more parameters comprise a PUCCH resource set, and wherein the configuration is a PUCCH configuration.

In Aspect 7, the method of any of Aspects 1 to 6 includes wherein the modified DCI format has one or more non-reserved fields as reserved bits.

In Aspect 8, the method of any of Aspects 1 to 7 includes wherein the modified DCI format has one or more fields, specifically for MB communications, from reserved bits.

In Aspect 9, the method of Aspect 8 includes wherein the one or more fields comprise a repetition number.

In Aspect 10, the method of any of Aspects 1 to 9 includes wherein the DCI format is a fallback DCI format for C-RNTI, and wherein determining that the DCI corresponds to MB communications is based on determining that the DCI is scrambled with a MB-RNTI or a G-RNTI.

In Aspect 11, the method of Aspect 10 includes wherein a field for power control is modified to be reserved.

In Aspect 12, the method of any of Aspects 1 to 9 includes wherein the DCI format is a fallback DCI format for P-RNTI or SI-RNTI, and wherein determining that the DCI corresponds to MB communications is based on determining that the DCI is scrambled with a P-RNTI or an SI-RNTI and determining that the DCI format is modified to include an indicator field to indicate whether the DCI is for MB communications.

In Aspect 13, the method of Aspect 12 includes wherein the indicator field further indicates different types of multicast services.

In Aspect 14, the method of any of Aspects 12 or 13 includes wherein a type of paging identity or a type of system information block is used in Radio Resource Control to indicate multicast control or data.

In Aspect 15, the method of any of Aspects 1 to 9 includes wherein the DCI format is a non-fallback DCI format for C-RNTI, and wherein determining that the DCI corresponds to MB communications is based on determining that the DCI is scrambled with a MB-RNTI.

In Aspect 16, the method of Aspect 15 includes wherein one or more fields for a second transport block, antenna ports, or sounding reference signal request are modified to be reserved.

In Aspect 17, the method of any of Aspects 1 to 16 includes wherein a flag in radio resource control or multicast control indicates whether one or more fields for HARQ acknowledgment are indicated in the modified DCI format.

Aspect 18 is an apparatus for wireless communication including a transceiver, a memory configured to store instructions, and one or more processors communicatively coupled with the memory and the transceiver. The one or more processors are configured to receive DCI of a DCI format, determine, based at least in part on a RNTI used to scramble the DCI, that the DCI corresponds to MB communications, determine the DCI format of the DCI corresponding to the MB communications, wherein the DCI format is modified for the MB communications, determine, from the DCI, one or more parameters associated with one or more fields of the modified DCI format for receiving the MB communications, and receive, based on the one or more parameters, the MB communications.

In Aspect 19, the apparatus of Aspect 18 includes wherein a size of the modified DCI format is unchanged.

In Aspect 20, the apparatus of any of Aspects 18 or 19 includes wherein the one or more parameters are determined based on a configuration that is for multicast only, or is a dedicated configuration shared by unicast and multicast, or is a common configuration shared by unicast and multicast.

In Aspect 21, the apparatus of Aspect 20 includes wherein the one or more fields comprise a frequency domain resource assignment, wherein the one or more parameters comprise a number of resource blocks, and wherein the configuration is a downlink BWP configuration.

In Aspect 22, the apparatus of any of Aspects 20 or 21 includes wherein the one or more fields comprise a time domain resource assignment, wherein the one or more parameters comprise a time domain resource allocation for a PDSCH, and wherein the configuration is a PDSCH configuration.

In Aspect 23, the apparatus of any of Aspects 20 to 22 includes wherein the one or more fields comprise a resource indicator for PUCCH, wherein the one or more parameters comprise a PUCCH resource set, and wherein the configuration is a PUCCH configuration.

In Aspect 24, the apparatus of any of Aspects 18 to 23 includes wherein the modified DCI format has one or more non-reserved fields as reserved bits.

In Aspect 25, the apparatus of any of Aspects 18 to 24 includes wherein the modified DCI format has one or more fields, specifically for MB communications, from reserved bits.

In Aspect 26, the apparatus of Aspect 25 includes wherein the one or more fields comprise a repetition number.

In Aspect 27, the apparatus of any of Aspects 18 to 26 includes wherein the DCI format is a fallback DCI format for C-RNTI, and wherein the one or more processors are configured to determine that the DCI corresponds to MB communications based on determining that the DCI is scrambled with a MB-RNTI or a G-RNTI.

In Aspect 28, the apparatus of Aspect 27 includes wherein a field for power control is modified to be reserved.

In Aspect 29, the apparatus of any of Aspects 18 to 26 includes wherein the DCI format is a fallback DCI format for P-RNTI or SI-RNTI, and wherein the one or more processors are configured to determine that the DCI corresponds to MB communications based on determining that the DCI is scrambled with a P-RNTI or an SI-RNTI and determining that the DCI format is modified to include an indicator field to indicate whether the DCI is for MB communications.

In Aspect 30, the apparatus of Aspect 29 includes wherein the indicator field further indicates different types of multicast services.

In Aspect 31, the apparatus of any of Aspects 29 or 30 includes wherein a type of paging identity or a type of system information block is used in Radio Resource Control to indicate multicast control or data.

In Aspect 32, the apparatus of any of Aspects 18 to 26 includes wherein the DCI format is a non-fallback DCI format for C-RNTI, and wherein the one or more processors are configured to determine that the DCI corresponds to MB communications based on determining that the DCI is scrambled with a MB-RNTI.

In Aspect 33, the apparatus of Aspect 32 includes wherein one or more fields for a second transport block, antenna ports, or sounding reference signal request are modified to be reserved.

In Aspect 34, the apparatus of any of Aspects 18 to 33 includes wherein a flag in radio resource control or multicast control indicates whether one or more fields for HARQ acknowledgment are indicated in the modified DCI format.

Aspect 35 is an apparatus for wireless communication including means for receiving DCI of a DCI format, means for determining, based at least in part on a RNTI used to scramble the DCI, that the DCI corresponds to MB communications, means for determining the DCI format of the DCI corresponding to the MB communications, wherein the DCI format is modified for the MB communications, means for determining, from the DCI, one or more parameters associated with one or more fields of the modified DCI format for receiving the MB communications, and means for receiving, based on the one or more parameters, the MB communications.

In Aspect 36, the apparatus of Aspect 35 includes wherein a size of the modified DCI format is unchanged.

In Aspect 37, the apparatus of any of Aspects 35 or 26 includes wherein the one or more parameters are determined based on a configuration that is for multicast only, or is a dedicated configuration shared by unicast and multicast, or is a common configuration shared by unicast and multicast.

In Aspect 38, the apparatus of Aspect 37 includes wherein the one or more fields comprise a frequency domain resource assignment, wherein the one or more parameters comprise a number of resource blocks, and wherein the configuration is a downlink BWP configuration.

In Aspect 39, the apparatus of any of Aspects 37 or 38 includes wherein the one or more fields comprise a time domain resource assignment, wherein the one or more parameters comprise a time domain resource allocation for a PDSCH, and wherein the configuration is a PDSCH configuration.

In Aspect 40, the apparatus of any of Aspects 37 to 39 includes wherein the one or more fields comprise a resource indicator for PUCCH, wherein the one or more parameters comprise a PUCCH resource set, and wherein the configuration is a PUCCH configuration.

In Aspect 41, the apparatus of any of Aspects 35 to 40 includes wherein the modified DCI format has one or more non-reserved fields as reserved bits.

In Aspect 42, the apparatus of any of Aspects 35 to 41 includes wherein the modified DCI format has one or more fields, specifically for MB communications, from reserved bits.

In Aspect 43, the apparatus of any of Aspects 35 to 42 includes wherein the DCI format is a fallback DCI format for C-RNTI, and wherein the means for determining that the DCI corresponds to MB communications is based on determining that the DCI is scramble/d with a MB-RNTI or a G-RNTI.

In Aspect 44, the apparatus of any of Aspects 35 to 42 includes wherein the DCI format is a fallback DCI format for P-RNTI or SI-RNTI, and wherein the means for determining that the DCI corresponds to MB communications is based on determining that the DCI is scrambled with a P-RNTI or an SI-RNTI and determining that the DCI format is modified to include an indicator field to indicate whether the DCI is for MB communications.

In Aspect 45, the apparatus of any of Aspects 35 to 42 includes wherein the DCI format is a non-fallback DCI format for C-RNTI, and wherein the means for determining that the DCI corresponds to MB communications is based on determining that the DCI is scrambled with a MB-RNTI.

Aspect 46 is a computer-readable medium, including code executable by one or more processors for wireless communications, the code includes code for receiving DCI of a DCI format, determining, based at least in part on a RNTI used to scramble the DCI, that the DCI corresponds to MB communications, determining the DCI format of the DCI corresponding to the MB communications, wherein the DCI format is modified for the MB communications, determining, from the DCI, one or more parameters associated with one or more fields of the modified DCI format for receiving the MB communications, and receiving, based on the one or more parameters, the MB communications.

Aspect 47 is a method for wireless communication including generating DCI for MB communications using a DCI format, wherein the DCI format is modified for MB communications, scrambling the DCI with a RNTI that corresponds to MB communications, transmitting the DCI, and transmitting, based on one or more parameters in the DCI, the MB communications.

In Aspect 48, the method of Aspect 47 includes wherein a size of the modified DCI format is unchanged.

In Aspect 49, the method of any of Aspects 47 or 48 includes wherein the one or more parameters are associated with one or more fields of the modified DCI format and are determined based on a configuration that is for multicast only, or is a dedicated configuration shared by unicast and multicast, or is a common configuration shared by unicast and multicast.

In Aspect 50, the method of Aspect 49 includes wherein the one or more fields comprise a frequency domain resource assignment, wherein the one or more parameters comprise a number of resource blocks, and wherein the configuration is a downlink BWP configuration.

In Aspect 51, the method of any of Aspects 49 or 50 includes wherein the one or more fields comprise a time domain resource assignment, wherein the one or more parameters comprise a time domain resource allocation for a PDSCH, and wherein the configuration is a PDSCH configuration.

In Aspect 52, the method of any of Aspects 49 to 51 includes wherein the one or more fields comprise a resource indicator for PUCCH, wherein the one or more parameters comprise a PUCCH resource set, and wherein the configuration is a PUCCH configuration.

In Aspect 53, the method of any of Aspects 47 to 52 includes wherein the modified DCI format has one or more non-reserved fields as reserved bits.

In Aspect 54, the method of any of Aspects 47 to 53 includes wherein generating the DCI includes specifying one or more fields, specifically for MB communications, from reserved bits.

In Aspect 55, the method of Aspect 54 includes wherein the one or more fields comprise a repetition number.

In Aspect 56, the method of any of Aspects 47 to 55 includes wherein the DCI format is a fallback DCI format for cell C-RNTI, and wherein scrambling the DCI with the RNTI includes scrambling the DCI with a MB-RNTI or a G-RNTI.

In Aspect 57, the method of Aspect 56 includes wherein a field for power control is modified to be reserved.

In Aspect 58, the method of any of Aspects 47 to 55 includes wherein the DCI format is a fallback DCI format for P-RNTI or SI-RNTI, and wherein scrambling the DCI with the RNTI includes scrambling the DCI with a P-RNTI or an SI-RNTI, and wherein generating the DCI includes specifying an indicator field to indicate whether the DCI is for MB communications.

In Aspect 59, the method of Aspect 58 includes wherein generating the DCI includes modifying the indicator field to further indicate different types of multicast services.

In Aspect 60, the method of any of Aspects 58 or 59 includes wherein a type of paging identity or a type of system information block is used in Radio Resource Control to indicate multicast control or data.

In Aspect 61, the method of any of Aspects 47 to 55 includes wherein the DCI format is a non-fallback DCI format for C-RNTI, and wherein scrambling the DCI with the RNTI includes scrambling the DCI with a MB-RNTI.

In Aspect 62, the method of Aspect 61 includes wherein generating the DCI includes modifying one or more fields for a second transport block, antenna ports, or sounding reference signal request to be reserved.

In Aspect 63, the method of any of Aspects 47 to 62 includes wherein a flag in radio resource control or multicast control indicates whether one or more fields for HARQ acknowledgment are indicated in the modified DCI format.

Aspect 64 is an apparatus for wireless communication including a transceiver, a memory configured to store instructions, and one or more processors communicatively coupled with the memory and the transceiver, wherein the one or more processors are configured to generate DCI for MB communications using a DCI format includes wherein the DCI format is modified for MB communications, scramble the DCI with a RNTI that corresponds to MB communications, transmit the DCI, and transmit, based on one or more parameters in the DCI, the MB communications.

In Aspect 65, the apparatus of Aspect 64 includes wherein a size of the modified DCI format is unchanged.

In Aspect 66, the apparatus of any of Aspects 64 or 65 includes wherein the one or more parameters are associated with one or more fields of the modified DCI format and are determined based on a configuration that is for multicast only, or is a dedicated configuration shared by unicast and multicast, or is a common configuration shared by unicast and multicast.

In Aspect 67, the apparatus of Aspect 66 includes wherein the one or more fields comprise a frequency domain resource assignment, wherein the one or more parameters comprise a number of resource blocks, and wherein the configuration is a downlink BWP configuration.

In Aspect 68, the apparatus of any of Aspects 66 or 67 includes wherein the one or more fields comprise a time domain resource assignment, wherein the one or more parameters comprise a time domain resource allocation for a PDSCH, and wherein the configuration is a PDSCH configuration.

In Aspect 69, the apparatus of any of Aspects 66 to 68 includes wherein the one or more fields comprise a resource indicator for PUCCH, wherein the one or more parameters comprise a PUCCH resource set, and wherein the configuration is a PUCCH configuration.

In Aspect 70, the apparatus of any of Aspects 64 to 69 includes wherein the modified DCI format has one or more non-reserved fields as reserved bits.

In Aspect 71, the apparatus of any of Aspects 64 to 70 includes wherein the one or more processors are configured to generate the DCI at least in part by specifying one or more fields, specifically for MB communications, from reserved bits.

In Aspect 72, the apparatus of Aspect 71 includes wherein the one or more fields comprise a repetition number.

In Aspect 73, the apparatus of any of Aspects 64 to 72 includes wherein the DCI format is a fallback DCI format for C-RNTI, and wherein scrambling the DCI with the RNTI includes scrambling the DCI with a MB-RNTI or a G-RNTI.

In Aspect 74, the apparatus of Aspect 73 includes wherein a field for power control is modified to be reserved.

In Aspect 75, the apparatus of any of Aspects 64 to 72 includes wherein the DCI format is a fallback DCI format for P-RNTI or SI-RNTI, and wherein scrambling the DCI with the RNTI includes scrambling the DCI with a P-RNTI or an SI-RNTI, and wherein generating the DCI includes specifying an indicator field to indicate whether the DCI is for MB communications.

In Aspect 76, the apparatus of Aspect 75 includes wherein the one or more processors are configured to generate the DCI at least in part by modifying the indicator field to further indicate different types of multicast services.

In Aspect 77, the apparatus of any of Aspects 75 or 76 includes wherein a type of paging identity or a type of system information block is used in Radio Resource Control to indicate multicast control or data.

In Aspect 78, the apparatus of any of Aspects 64 to 72 includes wherein the DCI format is a non-fallback DCI format for C-RNTI, and wherein scrambling the DCI with the RNTI includes scrambling the DCI with a MB-RNTI.

In Aspect 79, the apparatus of Aspect 78 includes wherein the one or more processors are configured to generate the DCI at least in part by modifying one or more fields for a second transport block, antenna ports, or sounding reference signal request to be reserved.

In Aspect 80, the apparatus of any of Aspects 64 to 79 includes wherein a flag in radio resource control or multicast control indicates whether one or more fields for HARQ acknowledgment are indicated in the modified DCI format.

Aspect 81 is a method for wireless communication including receiving DCI for multicast communications having an existing DCI format defined by a wireless communication technology, determining, based at least in part on a RNTI used to scramble the DCI, that the DCI corresponds to multicast communications, determining, from the DCI, one or more parameters for receiving multicast communications, and receiving, based on the one or more parameters, the multicast communications.

In Aspect 82, the method of Aspect 81 includes wherein the existing DCI format is defined for at least one of unicast signaling, paging signaling, or system information broadcast signaling.

In Aspect 83, the method of any of Aspects 81 or 82 includes wherein the existing DCI format is defined for unicast signaling, and wherein determining that the DCI corresponds to multicast communications is based on determining that the DCI is scrambled with a MB-RNTI or a G-RNTI.

In Aspect 84, the method of Aspect 83 includes determining, based at least in part on determining that the DCI is scrambled with a MB-RNTI, that the multicast communications correspond to a multicast control channel.

In Aspect 85, the method of any of Aspects 83 or 84 includes receiving, via RRC signaling, an indication of the MB-RNTI.

In Aspect 86, the method of any of Aspects 83 to 85 includes determining, based at least in part on determining that the DCI is scrambled with a G-RNTI, that the multicast communications correspond to a multicast data channel.

In Aspect 87, the method of any of Aspects 83 to 86 includes receiving, via RRC signaling or a multicast control channel, an indication of the G-RNTI.

In Aspect 88, the method of any of Aspects 83 to 87 includes wherein determining the one or more parameters includes determining the one or more parameters related to multicast communications in bits defined to indicate one or more parameters for unicast communications.

In Aspect 89, the method of Aspect 88 includes wherein the one or more parameters for unicast communications includes at least one of parameters related to a transmit power control command, parameters related to a DCI format identifier, parameters related to a carrier indication, parameters related to a bandwidth part indication, parameters related to virtual resource block to physical resource block mapping, parameters related to physical resource block bundling, parameters related to a second transport block, parameters related to a number of antenna ports or layers, or parameters related to a sounding reference signal.

In Aspect 90, the method of any of Aspects 88 or 89 includes wherein the one or more parameters for receiving multicast communications include a repetition number of the DCI format.

In Aspect 91, the method of any of Aspects 83 to 90 includes wherein determining the one or more parameters includes determining the one or more parameters as a number of resource blocks in a downlink bandwidth part dedicated for multicast communications or unicast communications, or a downlink bandwidth part dedicated for multicast communications and unicast communications or common for all communications.

In Aspect 92, the method of any of Aspects 83 to 91 includes wherein determining the one or more parameters includes determining the one or more parameters as resources for transmitting feedback for the multicast communications.

In Aspect 93, the method of Aspect 92 includes wherein determining the one or more parameters as resources for transmitting feedback is based at least in part on determining whether feedback fields are activated in the DCI.

In Aspect 94, the method of Aspect 93 includes determining whether feedback fields are activated in the DCI based at least in part on an indicator received via RRC signaling or via a multicast control channel.

In Aspect 95, the method of any of Aspects 81 to 94 includes wherein the existing DCI format is defined for paging signaling, and wherein determining that the DCI corresponds to multicast communications is based on determining that the DCI is scrambled with a P-RNTI and determining that the DCI includes an indicator for multicast communications.

In Aspect 96, the method of Aspect 95 includes wherein the indicator corresponds to the P-RNTI and determining that the DCI corresponds to multicast communications is based on determining that the P-RNTI reserved for multicast control or multicast data communications.

In Aspect 97, the method of Aspect 96 includes receiving, via RRC signaling, an indication of the P-RNTI.

In Aspect 98, the method of any of Aspects 95 to 97 includes wherein determining the one or more parameters includes determining the one or more parameters related to multicast communications in bits used to indicate a transmit power control command for unicast communications, and wherein determining that the DCI corresponds to multicast communications is based on the one or more parameters.

In Aspect 99, the method of Aspect 98 includes wherein the one or more parameters includes the indicator for multicast communications.

In Aspect 100, the method of Aspect 99 includes wherein the indicator indicates whether the DCI is for multicast control or multicast data communications.

In Aspect 101, the method of any of Aspects 98 to 100 includes wherein the one or more parameters relate to a repetition number of the DCI format.

In Aspect 102, the method of any of Aspects 95 to 101 includes wherein determining the one or more parameters includes determining the one or more parameters as a number of resource blocks in a downlink bandwidth part common for all communications.

In Aspect 103, the method of any of Aspects 81 to 102 includes wherein the existing DCI format is defined for SIB signaling, and wherein determining that the DCI corresponds to multicast communications is based on determining that the DCI is scrambled with a SI-RNTI and determining that the DCI includes an indicator for multicast communications.

In Aspect 104, the method of Aspect 103 includes wherein the indicator corresponds to a multicast SIB included in the DCI.

In Aspect 105, the method of Aspect 104 includes receiving, via RRC signaling, an indication of the multicast SIB.

In Aspect 106, the method of any of Aspects 103 to 105 includes wherein determining the one or more parameters includes determining the one or more parameters as a channel type indicator in reserved bits of the DCI format.

In Aspect 107, the method of Aspect 106 includes wherein the channel type indicator indicates whether the DCI is for multicast control or multicast data communications.

In Aspect 108, the method of any of Aspects 103 to 107 includes wherein the one or more parameters relate to a repetition number of the DCI format.

In Aspect 109, the method of any of Aspects 103 to 108 includes wherein determining the one or more parameters includes determining the one or more parameters as a number of resource blocks in a downlink bandwidth part common for all communications.

In Aspect 110, the method of any of Aspects 81 to 109 includes transitioning, based on determining that the RNTI corresponds to a paging RNTI or a system information RNTI, to a connected mode to receive the multicast communications.

In Aspect 111, the method of any of Aspects 81 to 110 includes determining a type of the multicast communications based on at least one of an indicator bit in the DCI, a paging group associated with the RNTI, or a type of system information block.

In Aspect 112, the method of any of Aspects 81 to 111 includes determining the existing DCI format based at least in part on an indicator received in RRC signaling or a MCCH.

In Aspect 113, the method of Aspect 112 includes determining a TCI state from the DCI, wherein the existing DCI format is DCI format 1_1.

In Aspect 114, the method of any of Aspects 81 to 113 includes determining the existing DCI format based at least in part on at least one of a RRC operation mode or a type of multicast service corresponding to the multicast communications.

Aspect 115 is a method for wireless communication including generating DCI for multicast communications using an existing DCI format defined by a wireless communication technology, wherein the DCI includes one or more parameters for receiving multicast communications, scrambling the DCI with a RNTI that corresponds to multicast communications, transmitting the DCI, and transmitting, based on the one or more parameters, the multicast communications.

In Aspect 116, the method of Aspect 115 includes wherein the existing DCI format is defined for at least one of unicast signaling, paging signaling, or system information broadcast signaling.

In Aspect 117, the method of any of Aspects 115 or 116 includes wherein the existing DCI format is defined for unicast signaling, and wherein scrambling the DCI comprises scrambling with a MB-RNTI or a G-RNTI that corresponds to multicast communications.

In Aspect 118, the method of Aspect 117 includes wherein the multicast communications correspond to a multicast control channel, and wherein scrambling the DCI comprises scrambling the DCI for the multicast control channel with a MB-RNTI.

In Aspect 119, the method of any of Aspects 117 or 118 includes transmitting, via RRC signaling, an indication of the MB-RNTI.

In Aspect 120, the method of any of Aspects 117 to 119 includes wherein the multicast communications correspond to a multicast data channel, and wherein scrambling the DCI comprises scrambling the DCI for the multicast data channel with a G-RNTI.

In Aspect 121, the method of any of Aspects 117 to 120 includes transmitting, via RRC signaling or a multicast control channel, an indication of the G-RNTI.

In Aspect 122, the method of any of Aspects 117 to 121 includes wherein generating the DCI comprises including the one or more parameters related to multicast communications in bits defined to indicate one or more parameters for unicast communications.

In Aspect 123, the method of Aspect 122 includes wherein the one or more parameters for unicast communications includes at least one of parameters related to a transmit power control command, parameters related to a DCI format identifier, parameters related to a carrier indication, parameters related to a bandwidth part indication, parameters related to virtual resource block to physical resource block mapping, parameters related to physical resource block bundling, parameters related to a second transport block, parameters related to a number of antenna ports or layers, or parameters related to a sounding reference signal.

In Aspect 124, the method of any of Aspects 122 or 123 includes wherein the one or more parameters for receiving multicast communications include a repetition number of the DCI format.

In Aspect 125, the method of any of Aspects 117 to 124 includes wherein generating the DCI comprises including the one or more parameters as a number of resource blocks in a downlink bandwidth part dedicated for multicast communications or unicast communications, or a downlink bandwidth part dedicated for multicast communications and unicast communications or common for all communications.

In Aspect 126, the method of any of Aspects 117 to 125 includes wherein generating the DCI comprises including the one or more parameters as resources for transmitting feedback for the multicast communications.

In Aspect 127, the method of Aspect 126 includes wherein including the one or more parameters as resources for transmitting feedback is based at least in part on determining whether feedback fields are activated in the DCI.

In Aspect 128, the method of Aspect 127 includes determining whether feedback fields are activated in the DCI based at least in part on an indicator transmitted via RRC signaling or via a multicast control channel.

In Aspect 129, the method of any of Aspects 115 to 128 includes wherein the existing DCI format is defined for paging signaling, wherein scrambling the DCI comprises scrambling the DCI with a P-RNTI, and wherein generating the DCI comprises including, in the DCI, an indicator for multicast communications.

In Aspect 130, the method of Aspect 129 includes wherein the indicator corresponds to the P-RNTI, wherein the P-RNTI is reserved for multicast control or multicast data communications.

In Aspect 131, the method of Aspect 130 includes transmitting, via RRC signaling, an indication of the P-RNTI.

In Aspect 132, the method of any of Aspects 129 to 131 includes wherein generating the DCI comprises including the one or more parameters in bits used to indicate a transmit power control command for unicast communications.

In Aspect 133, the method of Aspect 132 includes wherein the one or more parameters includes the indicator for multicast communications.

In Aspect 134, the method of Aspect 133 includes wherein the indicator indicates whether the DCI is for multicast control or multicast data communications.

In Aspect 135, the method of any of Aspects 132 to 134 includes wherein the one or more parameters relate to a repetition number of the DCI format.

In Aspect 136, the method of any of Aspects 129 to 135 includes wherein generating the DCI comprises including the one or more parameters as a number of resource blocks in a downlink bandwidth part common for all communications.

In Aspect 137, the method of any of Aspects 115 to 136 includes wherein the existing DCI format is defined for SIB signaling, and wherein scrambling the DCI comprises scrambling the DCI with a SI-RNTI and wherein generating the DCI comprises including, in the DCI, an indicator for multicast communications.

In Aspect 138, the method of Aspect 137 includes wherein the indicator corresponds to a multicast SIB included in the DCI.

In Aspect 139, the method of Aspect 138 includes transmitting, via RRC signaling, an indication of the multicast SIB.

In Aspect 140, the method of any of Aspects 137 to 139 includes wherein generating the DCI comprises including the one or more parameters as a channel type indicator in reserved bits of the DCI format.

In Aspect 141, the method of Aspect 140 includes wherein the channel type indicator indicates whether the DCI is for multicast control or multicast data communications.

In Aspect 142, the method of any of Aspects 137 to 141 includes wherein the one or more parameters relate to a repetition number of the DCI format.

In Aspect 143, the method of any of Aspects 137 to 142 includes wherein generating the DCI comprises including the one or more parameters as a number of resource blocks in a downlink bandwidth part common for all communications.

In Aspect 144, the method of any of Aspects 115 to 143 includes indicating a type of the multicast communications based on at least one of an indicator bit in the DCI, a paging group associated with the RNTI, or a type of system information block.

In Aspect 145, the method of any of Aspects 115 to 144 includes wherein generating the DCI is based on determining the existing DCI format based at least in part on an indicator specified in RRC signaling or a MCCH.

In Aspect 146, the method of Aspect 145 includes indicating, in the DCI, a TCI state in the DCI, wherein the existing DCI format is DCI format 1_1.

In Aspect 147, the method of any of Aspects 115 to 146 includes wherein the existing DCI format based at least in part on at least one of a RRC operation mode or a type of multicast service corresponding to the multicast communications.

Aspect 148 is a method for wireless communication including receiving DCI having a multicast DCI format defined for multicast communications and not including bits related to transmitting feedback for multicast communications, determining, from the DCI, one or more parameters for receiving multicast communications, and receiving, based on the one or more parameters, the multicast communications.

In Aspect 149, the method of Aspect 148 includes transmitting capability information indicating an ability to receive DCI based on the multicast DCI format.

Aspect 150 is a method for wireless communication including generating DCI for multicast communications using a multicast DCI format defined for multicast communications and not including bits related to transmitting feedback for multicast communications, wherein the DCI includes one or more parameters for receiving multicast communications, transmitting the DCI, and transmitting, based on the one or more parameters, the multicast communications.

In Aspect 151, the method of Aspect 150 includes receiving capability information indicating an ability to receive DCI based on the multicast DCI format, wherein generating the DCI using the multicast DCI format is based at least in part on the capability information.

Aspect 152 is an apparatus for wireless communication including a memory configured to store instructions, and one or more processors communicatively coupled with the memory, wherein the one or more processors are configured to execute the instructions to perform the operations of one or more methods in any of Aspects 1 to 17, Aspects 47 to 63, or Aspects 81-151.

Aspect 153 is an apparatus for wireless communication including means for performing one or more of the methods of any of Aspects 1 to 17, Aspects 47 to 63, or Aspects 81-151.

Aspect 154 is a computer-readable medium including code executable by one or more processors for wireless communications, the code including code for performing one or more of the methods of any of Aspects 1 to 17, Aspects 47 to 63, or Aspects 81-151.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the memory and the transceiver, wherein the one or more processors are configured to:
receive downlink control information (DCI) from a network node, wherein the DCI indicates a DCI format defined for unicast physical downlink shared channel (PDSCH) communications;
decode, based at least in part on a paging radio network temporary identifier (P-RNTI) used to scramble the DCI, the PDSCH scheduled by the DCI for multicast and/or broadcast (MB) communications including one or more parameters for receiving the MB communications, wherein the one or more parameters include a frequency domain resource assignment, indicated in the DCI, for receiving the MB communications; and
receive, based on the one or more parameters, the MB communications.

2. The apparatus of claim 1, wherein the one or more processors are configured to decode the PDSCH scheduled by the DCI further based at least in part on an indicator field in a radio resource control (RRC) configuration.

3. The apparatus of claim 2, wherein the indicator field indicates that the PDSCH scheduled by the DCI is for the MB communications.

4. The apparatus of claim 2, wherein the indicator field indicates at least one of multiple different MB services.

5. The apparatus of claim 1, wherein the one or more parameters include a time domain resource assignment.

6. The apparatus of claim 1, wherein the one or more parameters include a short message indicator or a short message.

7. A method for wireless communication, comprising:
receiving downlink control information (DCI) from a network node, wherein the DCI indicates a DCI format defined for unicast physical downlink shared channel (PDSCH) communications;
decoding, based at least in part on a paging radio network temporary identifier (P-RNTI) used to scramble the DCI, the PDSCH scheduled by the DCI for multicast and/or broadcast (MB) communications including one or more parameters for receiving the MB communications, wherein the one or more parameters include a frequency domain resource assignment, indicated in the DCI, for receiving the MB communications; and
receiving, based on the one or more parameters, the MB communications.

8. The method of claim 7, wherein decoding the PDSCH scheduled by the DCI is further based at least in part on an indicator field in a radio resource control (RRC) configuration.

9. The method of claim 8, wherein the indicator field indicates that the PDSCH scheduled by the DCI is for the MB communications.

10. The method of claim 8, wherein the indicator field indicates at least one of multiple different MB services.

11. The method of claim 8, wherein the one or more parameters include a time domain resource assignment.

12. The method of claim 8, wherein the one or more parameters include a short message indicator or a short message.

13. An apparatus for wireless communication, comprising:
a transceiver;
a memory configured to store instructions; and
one or more processors communicatively coupled with the memory and the transceiver, wherein the one or more processors are configured to:
encode, based at least in part on a paging radio network temporary identifier (P-RNTI) used to scramble a downlink control information (DCI), a physical downlink shared channel (PDSCH) scheduled by the DCI for multicast and/or broadcast (MB) communications including one or more parameters for receiving the MB communications, wherein the one or more parameters include a frequency domain resource assignment, indicated in the DCI, for receiving the MB communications;
transmit the DCI, wherein the DCI indicates a DCI format defined for unicast PDSCH communications; and
transmit, based on the one or more parameters, the MB communications.

14. The apparatus of claim 13, wherein the one or more processors are configured to encode the PDSCH scheduled by the DCI further based at least in part on an indicator field in a radio resource control (RRC) configuration.

15. The apparatus of claim 14, wherein the indicator field indicates that the PDSCH scheduled by the DCI is for the MB communications.

16. The apparatus of claim 14, wherein the indicator field indicates at least one of multiple different MB services.

17. The apparatus of claim 13, wherein the one or more parameters include a short message indicator or a short message.

* * * * *